(12) United States Patent
Yoshida

(10) Patent No.: US 8,368,954 B2
(45) Date of Patent: Feb. 5, 2013

(54) IMAGE PROCESSING METHOD

(76) Inventor: Kenji Yoshida, Tokyo (JP)

( * ) Notice: Subject to any disclaimer, the term of this patent is extended or adjusted under 35 U.S.C. 154(b) by 763 days.

(21) Appl. No.: 12/162,955

(22) PCT Filed: Jan. 31, 2007

(86) PCT No.: PCT/JP2007/052064
§ 371 (c)(1),
(2), (4) Date: Aug. 15, 2008

(87) PCT Pub. No.: WO2007/089021
PCT Pub. Date: Aug. 9, 2007

(65) Prior Publication Data
US 2009/0059299 A1 Mar. 5, 2009

(30) Foreign Application Priority Data
Jan. 31, 2006 (JP) .................. 2006-049190

(51) Int. Cl.
H04N 1/40 (2006.01)
(52) U.S. Cl. ........................................ 358/1.9; 358/448
(58) Field of Classification Search .................... 358/1.9, 358/2.1, 448, 453, 504, 406; 382/209, 215
See application file for complete search history.

(56) References Cited

U.S. PATENT DOCUMENTS

| 5,416,312 | A | 5/1995 | Lamoure |
| 6,198,472 | B1 | 3/2001 | Lection et al. |
| 7,664,312 | B2 | 2/2010 | Yoshida |
| 7,876,460 | B2 | 1/2011 | Yoshida |
| 2002/0089500 | A1 | 7/2002 | Jennings, Jr. et al. |
| 2003/0012455 | A1 | 1/2003 | Olsson et al. |
| 2005/0138568 | A1 | 6/2005 | Gilfix |
| 2005/0149258 | A1 | 7/2005 | Gargi |
| 2005/0173544 | A1 | 8/2005 | Yoshida |
| 2005/0190144 | A1 | 9/2005 | Kong |
| 2006/0154559 | A1 | 7/2006 | Yoshida |
| 2008/0043258 | A1 | 2/2008 | Yoshida |
| 2009/0066977 | A1 | 3/2009 | Yoshida |
| 2009/0262071 | A1 | 10/2009 | Yoshida |
| 2010/0133351 | A1 | 6/2010 | Yoshida |

FOREIGN PATENT DOCUMENTS

| JP | 2004-029975 A | 1/2004 |
| JP | 2005267624 A1 | 9/2005 |
| JP | 2006338690 A1 | 12/2006 |
| JP | 2007012016 A1 | 1/2007 |
| JP | 4008952 B2 | 11/2007 |
| WO | 9932958 A1 | 7/1999 |
| WO | 0148685 A1 | 7/2001 |
| WO | 2004/084125 A | 9/2004 |
| WO | 2005114546 A1 | 12/2005 |

OTHER PUBLICATIONS

Supplementary European Patent Search Report for European Patent Application No. EP 07708114, mailed Jun. 20, 2011.

Primary Examiner — Thomas D Lee
Assistant Examiner — Stephen M Brinich
(74) Attorney, Agent, or Firm — Smith Patent Office

(57) ABSTRACT

A technology that enables accurate position specification on an image displayed on a screen to perform processing and correction of the image data is provided. When the image is printed on a sheet on which a dot pattern is printed, a reference point of the image on the display device is set and the reference point is printed in a visible mark together with the image. This mark is imaged with an imaging means, and calibration is performed in which position coordinates of the marks on the sheet and the reference points of the image are matched, thereby preventing variation in coordinates between designation made on the sheet with the imaging means and processing on the image.

9 Claims, 29 Drawing Sheets (a) DOT CODE FORMAT FOR CONTROLLER AREA

| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|---|
| PARITY | | | | CONTROLLER ID | | | | | | | | | | | | | | OPERATION CODE | | | | | | | | | | | | | |

(b)

FIG. 9    DOT CODE FORMAT FOR XY COORDINATES AREA

| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ | $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|---|---|---|---|---|---|---|---|---|---|---|---|---|---|---|---|
| PARITY | | | | | PAPER ID | | | | | | | | | | | X COORDINATE | | | | | | | | Y COORDINATE | | | | | | |

FIG. 10
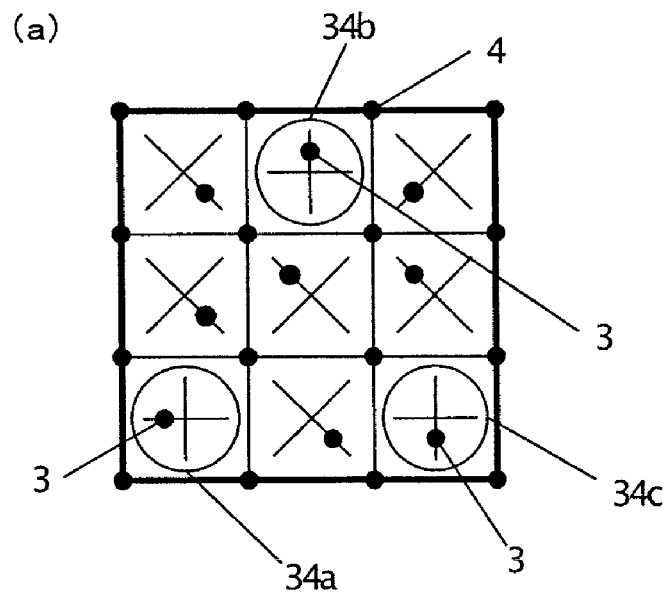
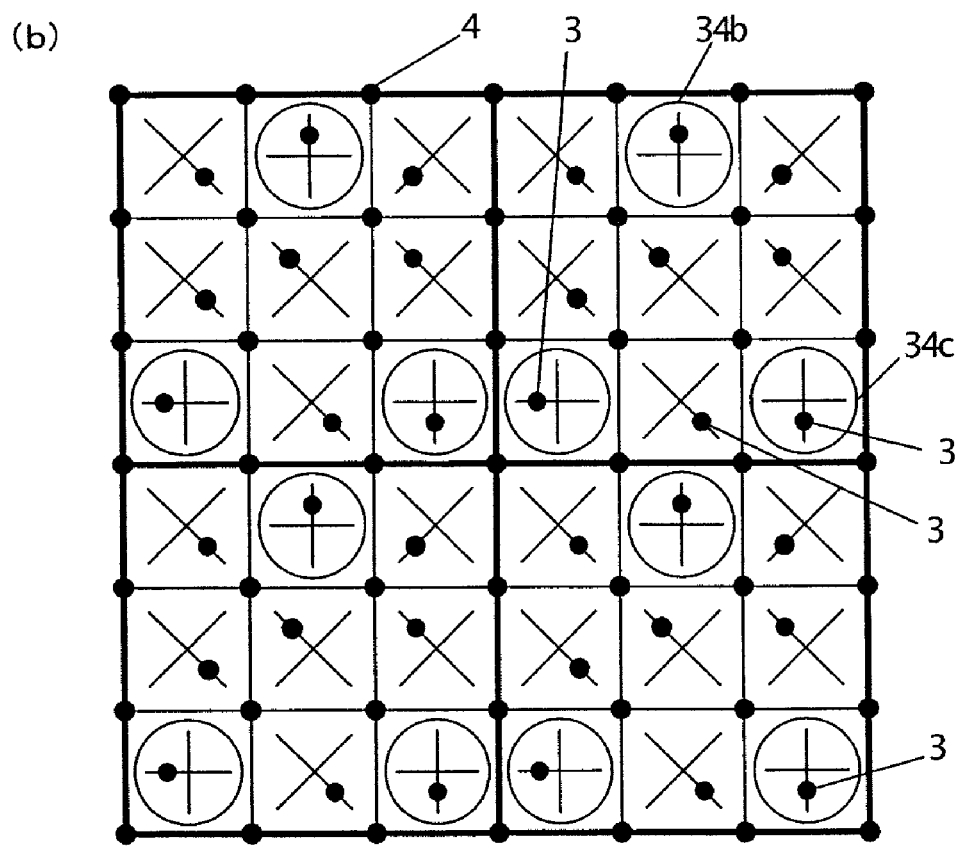

FIG. 11
(a)
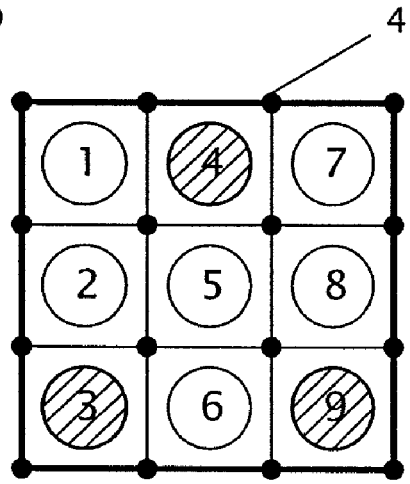
(b)
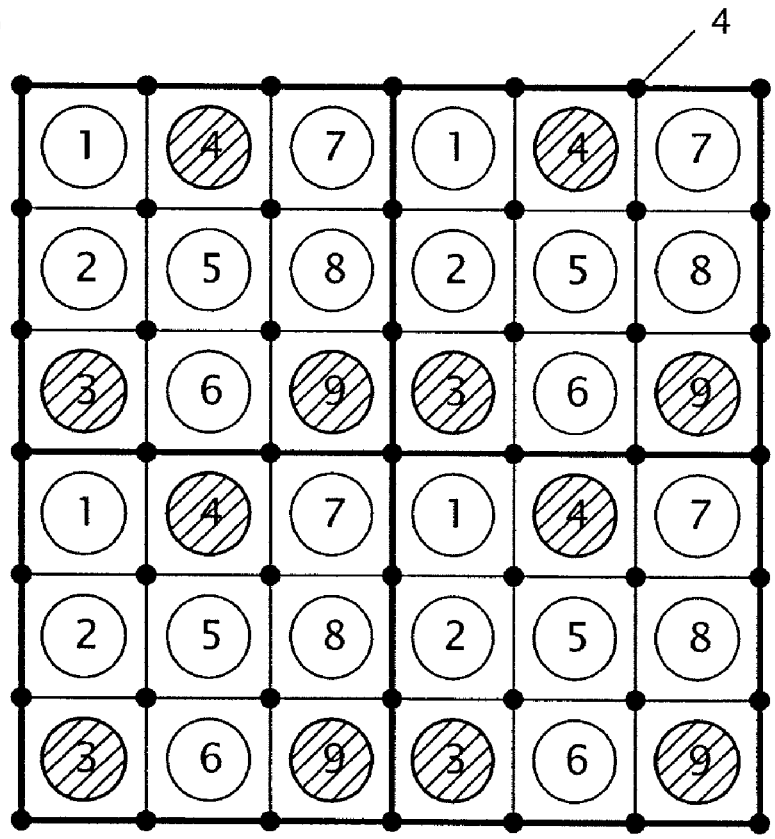

FIG. 13

| | DOT CODE | COMMAND |
|---|---|---|
| PAPER CONTROLLER AREA | 101 | MASK CREATION INSTRUCTION |
| | 102 | MASK REGISTRATION INSTRUCTION |
| | 103 | |
| | | POINT SPECIFICATION INSTRUCTION |
| | | DETERMINATION INSTRUCTION |
| | | |

PAPER TABLET FOR MASK CREATION

FIG. 16

| Y \ X | 0 | 1 | 2 | 3 | 4 | 5 | 6 | 7 | 8 | 9 | 10 | .... | .... |
|---|---|---|---|---|---|---|---|---|---|---|---|---|---|
| 0 | | | | | | | | | | | | | |
| 1 | | | 1 | 1 | 1 | | | | | | | | |
| 2 | | | 1 | 1 | 1 | 1 | 1 | | 2 | 2 | 2 | | |
| 3 | | | 1 | 1 | 1 | 1 | 1 | | 2 | 2 | 2 | | |
| 4 | | | 1 | 1 | 1 | 1 | 1 | | 2 | 2 | 2 | | |
| 5 | | | 1 | 1 | 1 | 1 | 1 | | 2 | 2 | 2 | | |
| 6 | | | | | | | | | | | | | |
| 7 | | | | | | | | | | | | | |
| 8 | | | | | | | | | | | | | |
| ⋮ | | | | | | | | | | | | | |
| ⋮ | | | | | | | | | | | | | |
| ⋮ | | | | | | | | | | | | | |
| ⋮ | | | | | | | | | | | | | |

FIG. 17

| MASK NO. | ADDRESS |
|---|---|
| 1 | www.······ |
| 2 | C\······ |
| 3 | D\······ |
| ⁀ | ⁀ |

| MASK NO. | DOT CODE |
|---|---|
| 1 | 54001 |
| 2 | 54002 |
| 3 | 54003 |
| 4 | |
| 5 | |

(b)

| DOT CODE | ADDRESS |
|---|---|
| 54001 | www.・・・・・・・・ |
| 54002 | C\・・・・・・・・ |
| 54003 | D\・・・・・・・・ |
| 54004 | www.・・・・・・・・ |
| | |

FIG. 23
(a)
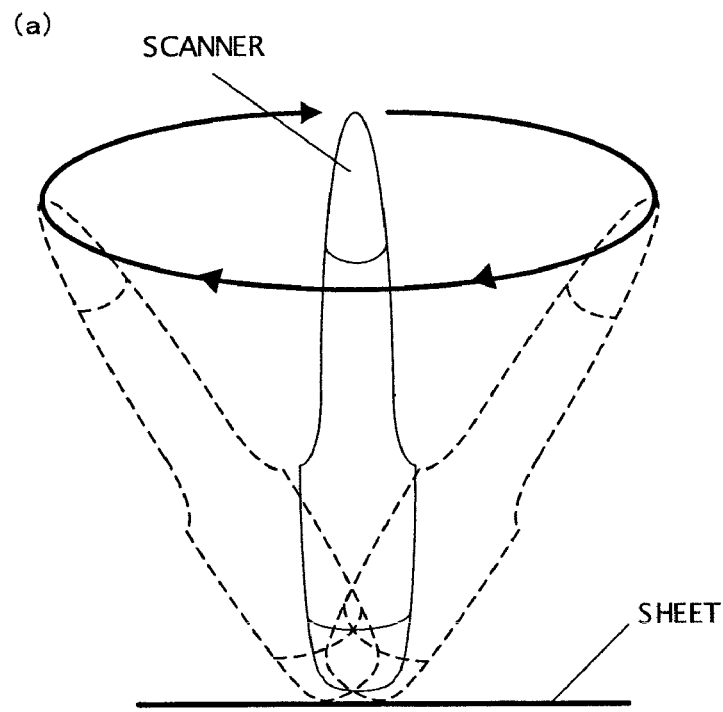
(b)
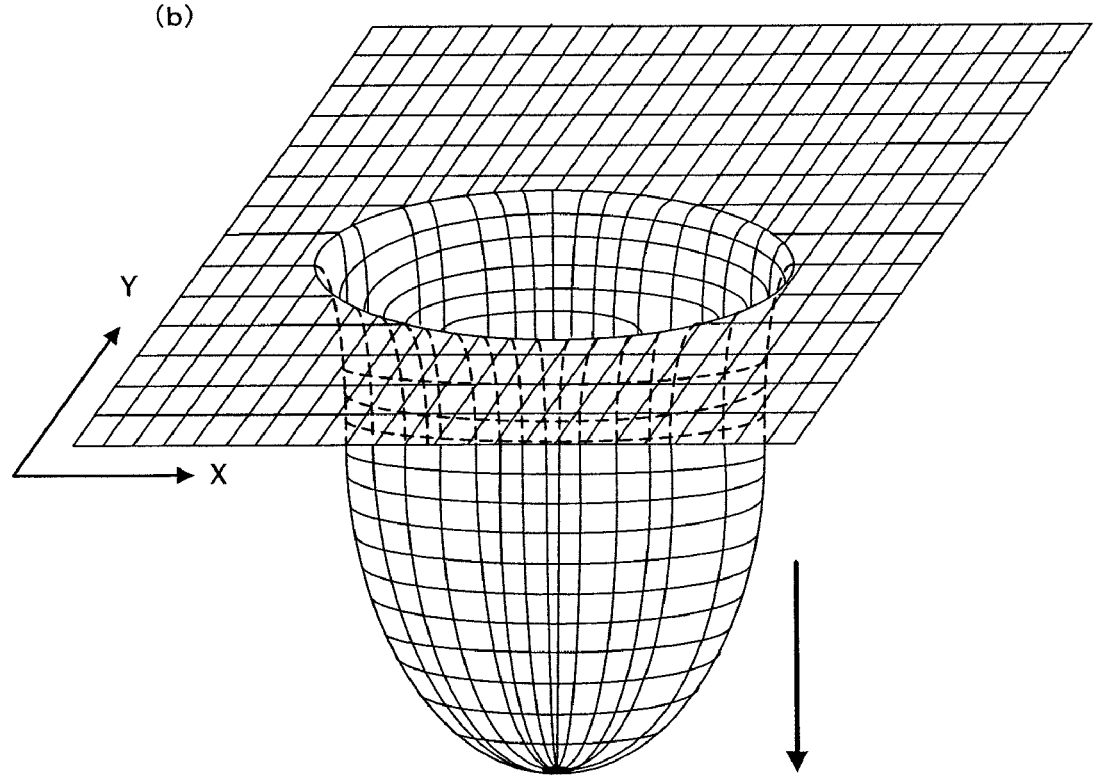

FIG. 26   MEASURING METHOD OF TILTED DIRECTION/ANGLE (1)   BLO(j) i=1,n(=48)

FIG. 27
(a) MEASURING METHOD OF TILTED DIRECTION/ANGLE (2)
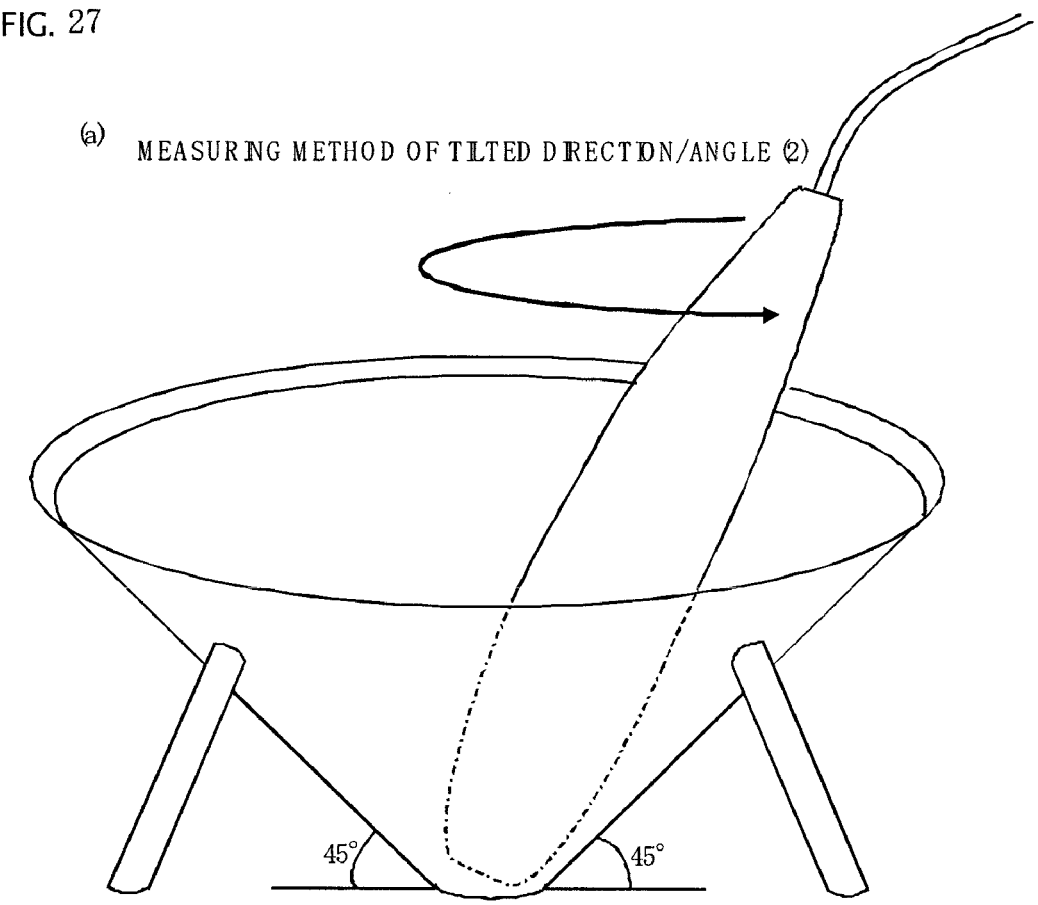
(b)
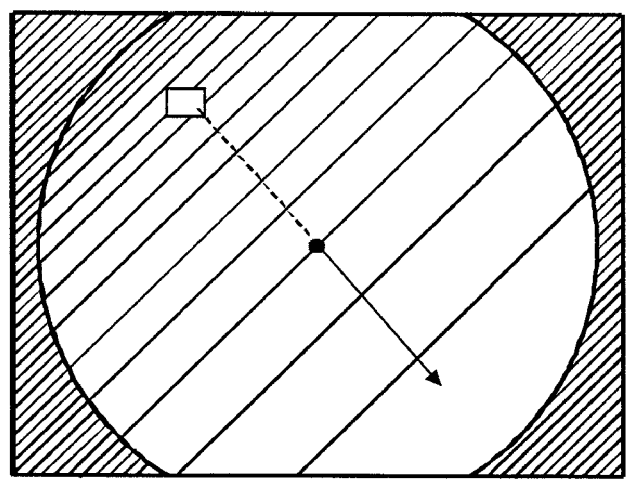

FIG. 29
MEASURING METHOD BY FOURIER FUNCTION
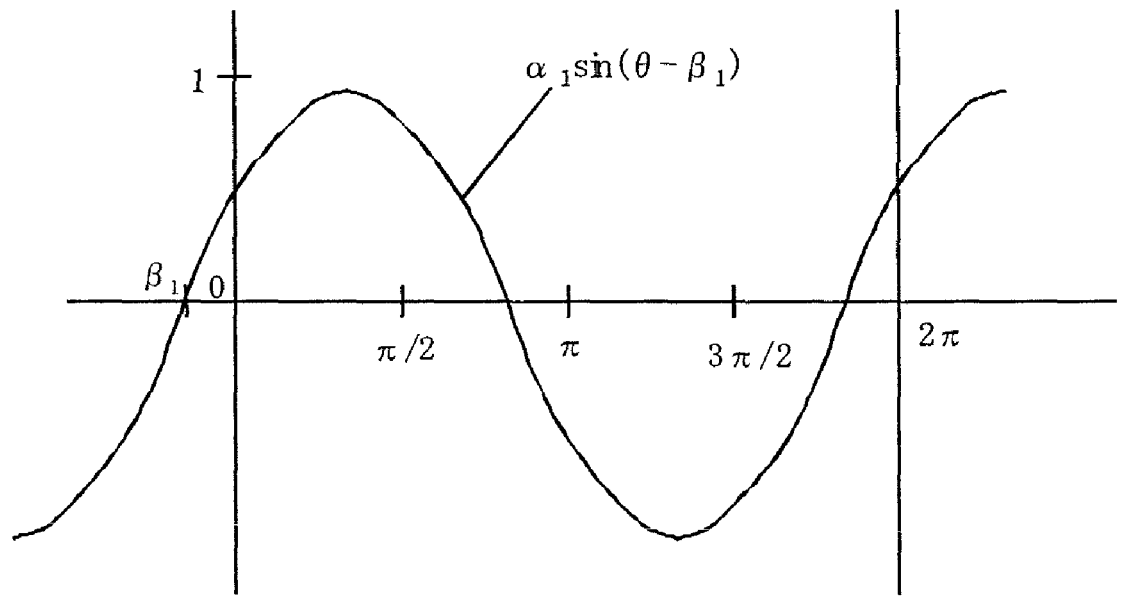
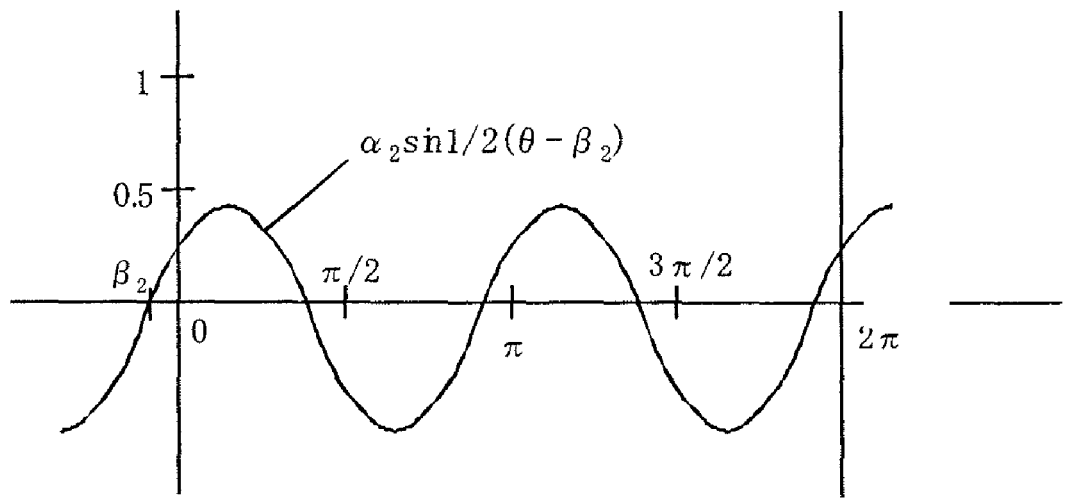
$$BL(i) = \sum_{j=1}^{\frac{n}{2}} \alpha_j \left\{ \sin\left(\frac{1}{2}\right)^{j-1}(\theta - \beta_j) \right\}$$
WHERE n=2m (n IS NUMBER OF MEASUREMENT POINTS)

FIG. 31
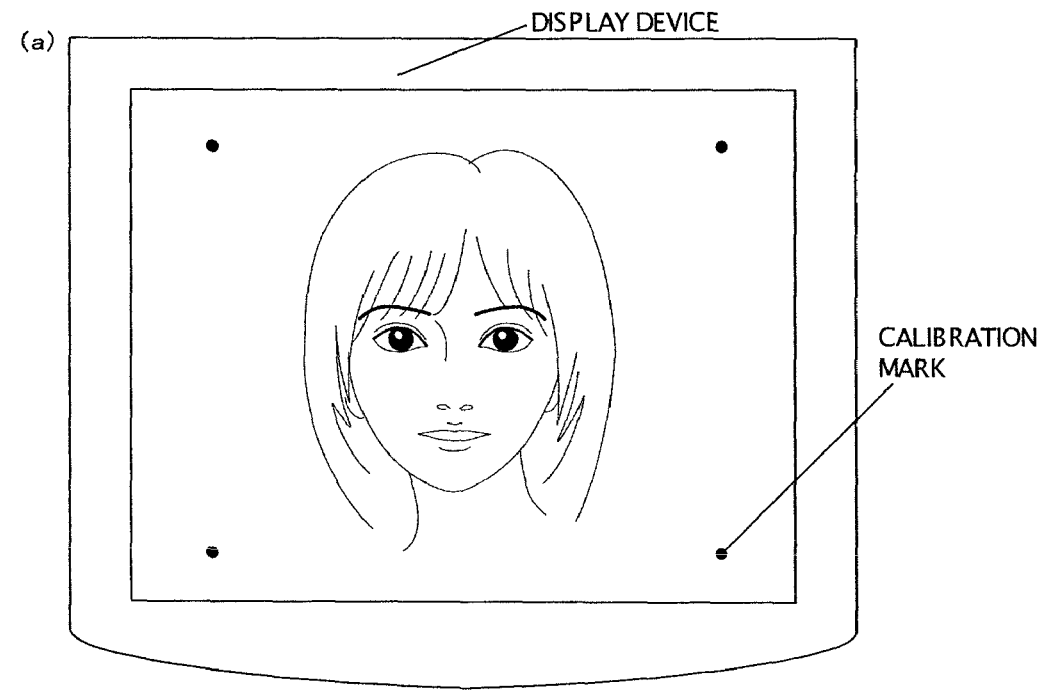
(a) DISPLAY DEVICE, CALIBRATION MARK
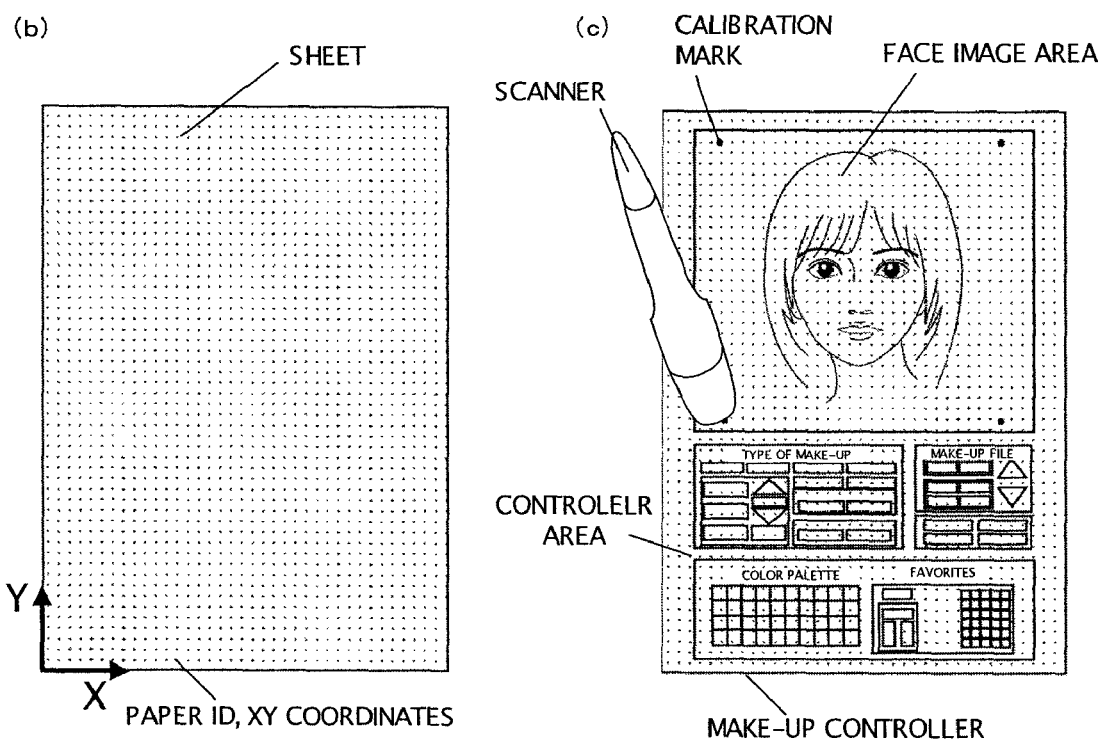
(b) SHEET — PAPER ID, XY COORDINATES
(c) SCANNER, CALIBRATION MARK, FACE IMAGE AREA, CONTROLELR AREA, MAKE-UP CONTROLLER FIG. 33
(a)
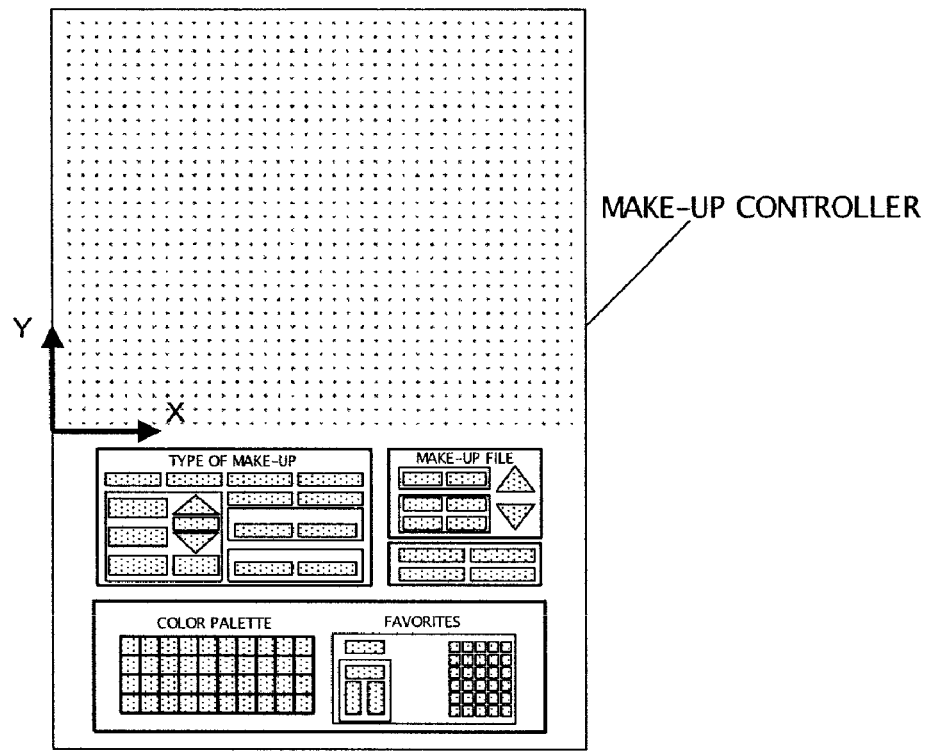
MAKE-UP CONTROLLER
(b)
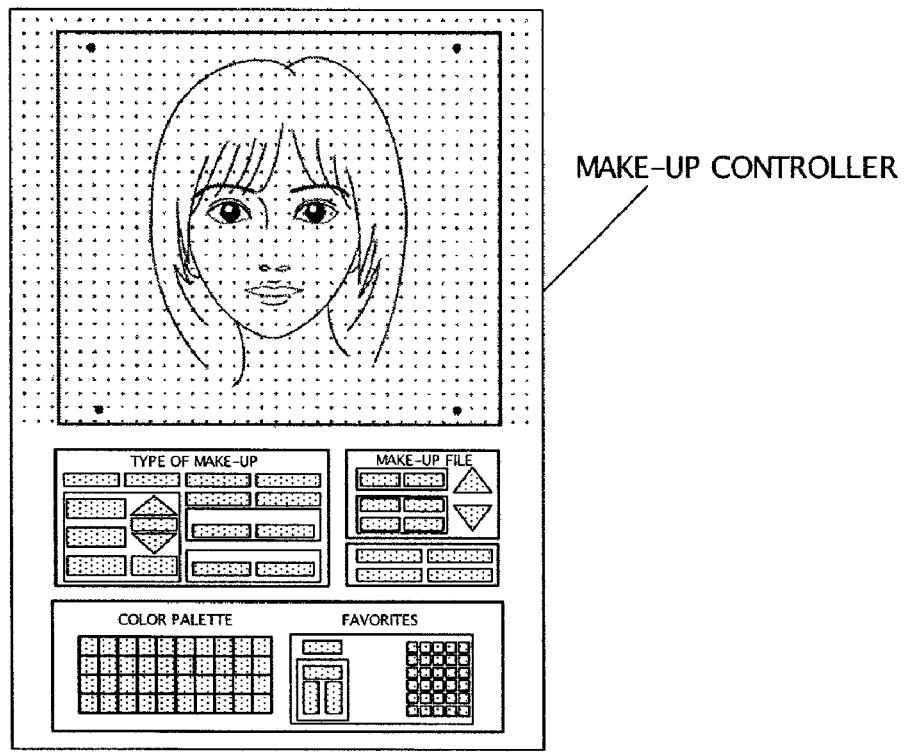
MAKE-UP CONTROLLER FIG. 34
(a)
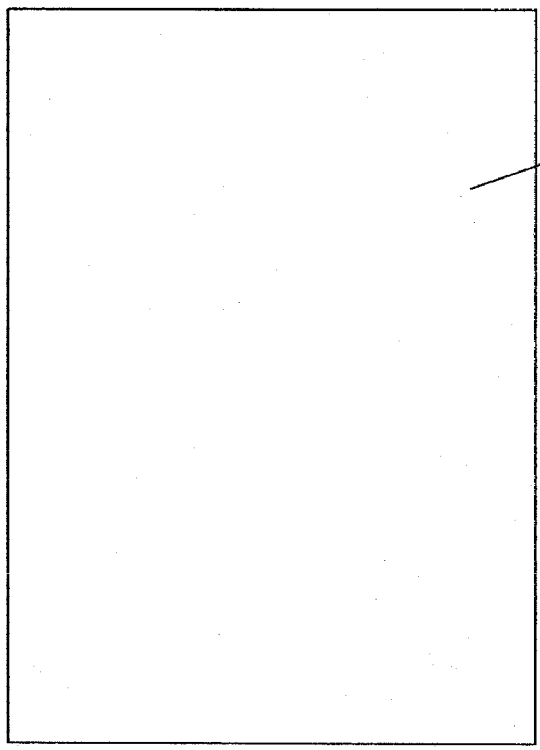
PRINT SHEET (BLANK)
(b)
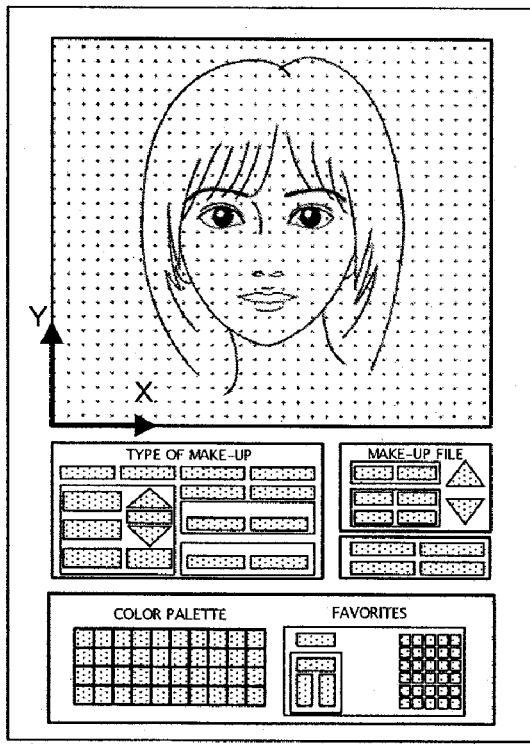
MAKE-UP CONTROLLER

IMAGE PROCESSING METHOD

TECHNICAL FIELD

The present invention relates to a technology for processing and correcting an image displayed on a display or on a projector screen using a sheet or a panel on which a dot pattern is printed.

BACKGROUND ART

As a technology to process and correct an image that is projected on a display screen or on a projector screen, it has been common to correct colors and diagrammatic drawings of image data stored in an information processing device such as a personal computer, by using a coordinate-input supporting device such as a mouse and a graphic tablet.

DISCLOSURE OF INVENTION

Problem to be Solved by the Invention

However, in the case of using a mouse or a graphic tablet, it is required to operate the mouse or the graphic tablet while staring at the screen. Therefore, the operation feeling at hand is not always accurately reflected to position specification on the screen.

Specifically, with a mouse or a graphic tablet, since a shift amount in XY directions is converted into a shift amount on a screen to be displayed thereon, it has been often the case that a shift amount of a cursor on the screen is too small or too large compared to a shift amount of the mouse, resulting in discomfort of the operator (user).

Particularly, when coloring or color correction is performed as putting makeup on a face image displayed on a screen, or when an area on a map is specified to be process, there has been a problem that accurate position specification is difficult with a mouse or a graphic tablet.

The present invention is achieved in view of such problems, and it is an object of the present invention to provide a technology that enables to specify a position accurately on an image displayed on a screen to perform processing and correction of the image data.

Means for Solving Problem

A first aspect of the present invention is an image processing method of processing an image displayed on a display device, the image processing method in which the image is printed on a sheet on which a dot pattern has been printed, and the dot pattern is imaged by an imaging means, thereby enabling position recognition on the image. The image processing method includes printing the dot pattern indicating XY coordinates on the sheet; printing the image displayed on a screen of the display device, on the sheet on which the dot pattern is printed; setting and printing a reference point of the image displayed on the display device in a form of a visible mark together with the image, at the printing the image; performing calibration to match coordinates of a position of the mark on the sheet with the reference point of the image, by imaging the mark printed on the sheet by the imaging means; and performing an image processing on the image printed on the sheet by the imaging means.

By thus setting the reference point of the image on the display device and printing the reference point in a visible mark together with the image at the time of printing the image displayed on the display device on the sheet on which the dot pattern has been printed, and by performing the calibration using the mark, it is possible to prevent variation in coordinates between designation made on the sheet with the imaging means (scanner) and processing on the image.

A second aspect of the present invention is an image processing method of processing an image displayed on a display device, the image processing method in which the image is printed on a sheet on which a dot pattern has been printed, and the dot pattern is imaged by an imaging means, thereby enabling position recognition on the image. The image processing method includes printing the dot pattern indicating XY coordinates on the sheet; printing the image displayed on a screen of the display device, on the sheet on which the dot pattern is printed; specifying a mask area by scanning a predetermined area on which the image is printed on the sheet so as to draw a closed figure with the imaging means; setting a flag in an area for which the mask is set in a mask table set in a storage means, the area corresponding to the image area; imaging a dot pattern in the mask area on the sheet by the imaging means; and executing a processing according to a command, referring to a mask/processing command table in which commands corresponding to the mask are defined when the dot pattern in the mask area is read and is determined to be the area for which the mask is set as a result of referring to the mask table.

As described, when the image displayed on the display device is printed on the sheet on which the dot pattern is printed in advance, a mask is set in an arbitrary area on the image, and the mask area is selected on the sheet by the imaging means, the mask table is referred and a processing associated therewith, for example, access to a predetermined address (URL) on the Internet by a browser program, can be executed.

A third aspect of the present invention is an image processing method of processing an image displayed on a display device, the image processing method in which the image is printed on a sheet on which a dot pattern is printed in advance, and the dot pattern is imaged by an imaging means, thereby enabling position recognition on the image. The image processing method includes printing the image displayed on a screen of the display device, on the sheet on which a dot pattern indicating XY coordinates is printed in advance; setting and printing a reference point of the image displayed on the display device in a form of a visible mark together with the image, at the printing the image; performing calibration to match coordinates of a position of the mark on the sheet with the reference point of the image, by imaging the mark printed on the sheet by the imaging means; and performing an image processing on the image printed on the sheet by the imaging means.

A fourth aspect of the present invention is an image processing method of performing an image processing that corresponds to a dot pattern, on an image displayed on a display device, by imaging a medium on which the dot pattern is printed by an optical reading means, wherein a controller as the medium on which dot patterns are printed in a superimposed manner with icon images is used, the dot patterns in which a command code for the image processing or a coordinate value is patterned. The image processing method includes selecting a brush to be used for the image processing by sequentially imaging the icon images in the controller by the optical reading means; selecting a drawing color by imaging an icon image in the controller by the optical reading means; and performing a drawing processing on the screen of the display device by scanning with the optical reading means on the controller, the drawing processing corresponding to a trail of scanning.

A fifth aspect of the present invention is the image processing method according to any one of the first to the fourth aspects, wherein the image processing is a two-dimensional image processing or a processing to cause three-dimensional deformation performed on an area that is a part or all of an image area specified by making a predetermined movement with the imaging means on the sheet, the image area corresponding to the sheet and displayed on the display device.

As described, the sheet on which XY coordinates are printed in advance can be provided as a supply product so that the image displayed on the display device is printed on this sheet and the image processing is performed on the image.

The deformation of the image area can be achieved by a grid grind operation of the imaging means, that is, rotation about a vertical line in a tilt state in which a certain inclination of an imaging optical axis relative to the vertical line of a medium surface is kept. The deformation of the image area can be deformation in a rise in a Z direction in the image area and deformation in a dent in a −Z direction (sixth aspect).

A seventh aspect of the present invention is the image processing method according to the fifth or the sixth aspect, wherein the image processing is a modeling processing on the image, and a predetermined position of the image is specified to deform a corresponding portion of the image in a rise or in a dent in the Z direction or in the −Z direction, respectively.

An eighth aspect of the present invention is the image processing method according to the seventh aspect, wherein in the modeling processing, a mask is set in a predetermined shape of an image, and a corresponding portion of the image along a mask shape is expanded or raised in the Z direction or in the −Z direction, respectively.

A ninth aspect of the present invention is the image processing method according to any one of the first to the seventh aspects, wherein the reference point of the image is arranged at, at least, two points, and the mark is also printed at, at least, two points on the sheet corresponding thereto.

As described, by performing the calibration using the marks at two points, it is possible to prevent displacement of angles in the XY direction and in a θ direction at the time of input of selection on the sheet by the scanner. The calibration can be performed with marks at three or more points to increase the accuracy.

Effect of the Invention

According to the present invention, it is possible to easily perform processing and correction of image data displayed on a screen of a display device, by accurately specifying a position on an image printed on a sheet.

BRIEF DESCRIPTION OF DRAWINGS

FIG. 9 is a diagram for explaining a dot code format in an XY coordinates area;

FIG. 10 is an explanatory diagram in which a block direction is defined by changing arrangement of the information dots in the dot pattern shown in FIG. 2 to FIG. 7;

FIG. 11 is an explanatory diagram in which a block direction is defined by changing arrangement of the information dots in the dot pattern shown in FIG. 2 to FIG. 7, and shows the arrangement of the information dots;

FIG. 13 is an explanatory diagram showing a dot code/processing command table used in a mask specification processing;

FIG. 16 is an explanatory diagram of a mask table that is used in the mask specification processing;

FIG. 17 is an explanatory diagram of a mask/address table that is used in the mask specification processing;

FIG. 19 is an explanatory diagram of tables used in the mask specification processing; (a) is a mask/dot code table, and (b) is a dot code/address table;

FIG. 23 is an explanatory diagram of a function of performing the modeling by rotating a scanner; (a) shows movement of the scanner, and (b) shows a processing to be done by the movement of the scanner;

FIG. 26 is a diagram for explaining a method of measuring an inclined direction and an angle when various operations are performed by tilting the scanner;

FIG. 27 is a diagram for explaining a method of measuring an inclined direction and an angle when various operations are performed by tilting the scanner;

FIG. 29 is a diagram for explaining a method of measuring an inclined direction using a Fourier function when various operations are performed by tilting the scanner;

FIG. 31 is an explanatory diagram of make-up simulation; (a) is a diagram showing an image that is displayed on a screen of a display device, (b) is a diagram showing a sheet used in the present embodiment, and (c) is a diagram showing a state in which a face image and a controller are printed on the sheet;

FIG. 33 is an explanatory diagram of the make-up simulation, and is a diagram explaining a case where a face image is printed using a supply sheet on which a dot pattern is printed in advance; and FIG. 34 is an explanatory diagram of the make-up simulation, and is a diagram explaining a case where a dot pattern and an image are printed at the same time on a blank sheet.

EXPLANATIONS OF LETTERS OR NUMERALS

1 Dot pattern
2 Key dot
3 Information dot
4 Reference grid point dot
5 Virtual gird point
CPU Central processing unit
MM Main memory
USB I/F USB interface
HD Hard disk device
DISP Display device (display unit)
KBD Keyboard
NW I/F Network interface
SCN Scanner

BEST MODE(S) FOR CARRYING OUT THE INVENTION

<Hardware Block Diagram>

Figure 1:
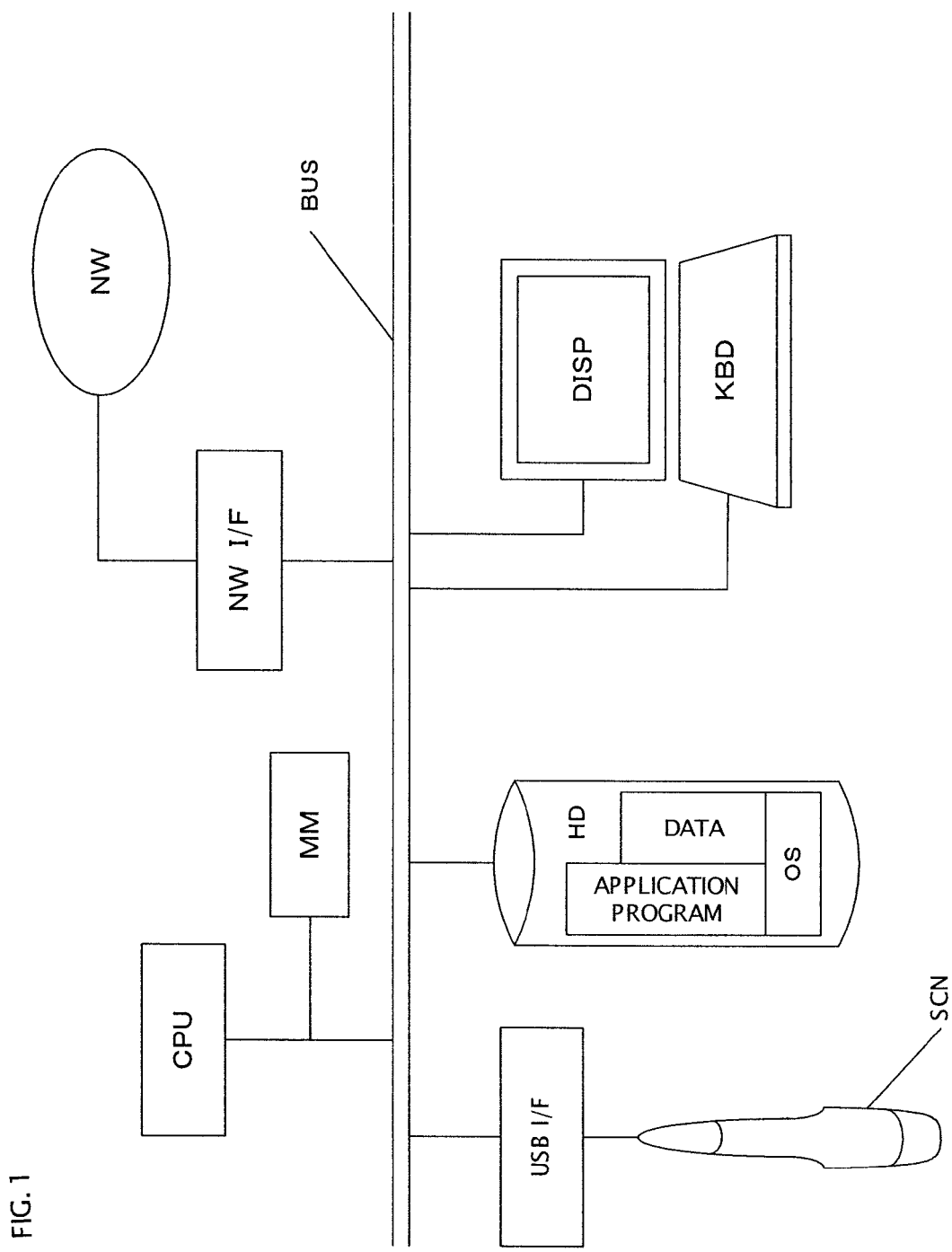
FIG. 1 is a block diagram showing a system configuration of a scanner and a computer that are used in the present invention.

FIG. 1 is a hardware block diagram showing a configuration of a computer and a scanner.

As shown in the figure, a personal computer includes a central processing unit (CPU) as the center, a main memory (MM), a hard disk unit (HD) that is connected through a bus, a display device (DISP) as an output unit, and a keyboard (KBD) as an input unit.

A scanner (SCN) as an imaging means is connected through a USB interface (USB I/F).

Although illustration thereof is omitted, a printer, a speaker, and the like are connected as an output device other than the display device (DISP).

Moreover, the bus (BUS) is connected to a general-purpose network (NW) such as the Internet, through a network interface (NW I/F), and electronic map data, character information, image information, sound information, animation information, programs, and the like can be downloaded from a server not shown.

The hard disk (HD) stores data including application programs such as a program for analyzing a dot pattern used in the present embodiment, electronic map data, character information, image information, sound information, animation information, various tables, and the like, together with an operating system (OS).

The central processing unit (CPU) sequentially reads to execute the application program in the hard disk through the bus (BUS) and the main memory (MM), and reads data to output to the display device (DISP), thereby implementing a function explained in the present embodiment.

Although illustration is omitted, the scanner (SCN) includes an infrared-ray irradiating means (red LED), an IR filter, and an optical imaging device such as a CMOS sensor or a CCD sensor, and has a function of imaging reflected light of irradiation light that is irradiated on a surface of a medium. A dot pattern on the surface of the medium is printed with carbon ink, and parts other than the dot pattern are printed with non-carbon ink.

Since the carbon ink has a property of absorbing infrared light, only dot portions are imaged black in an image captured by the optical imaging device.

The image of the dot pattern thus captured is analyzed by the central processing unit (CPU) in the scanner (SCN) to be converted into coordinate values or code values, and send to the personal computer through the USB cable.

The central processing unit (CPU) of the personal computer refers to a table of the coordinate values or the code values received, and electronic map data, character information, image information, sound information, and animation information that correspond thereto are output from the display device (DISP) or a speaker not shown.

<Explanation of Dot Pattern: GRID1>

Next, a dot pattern used in the present invention is explained referring to FIG. 2 to FIG. 7.

Figure 2:
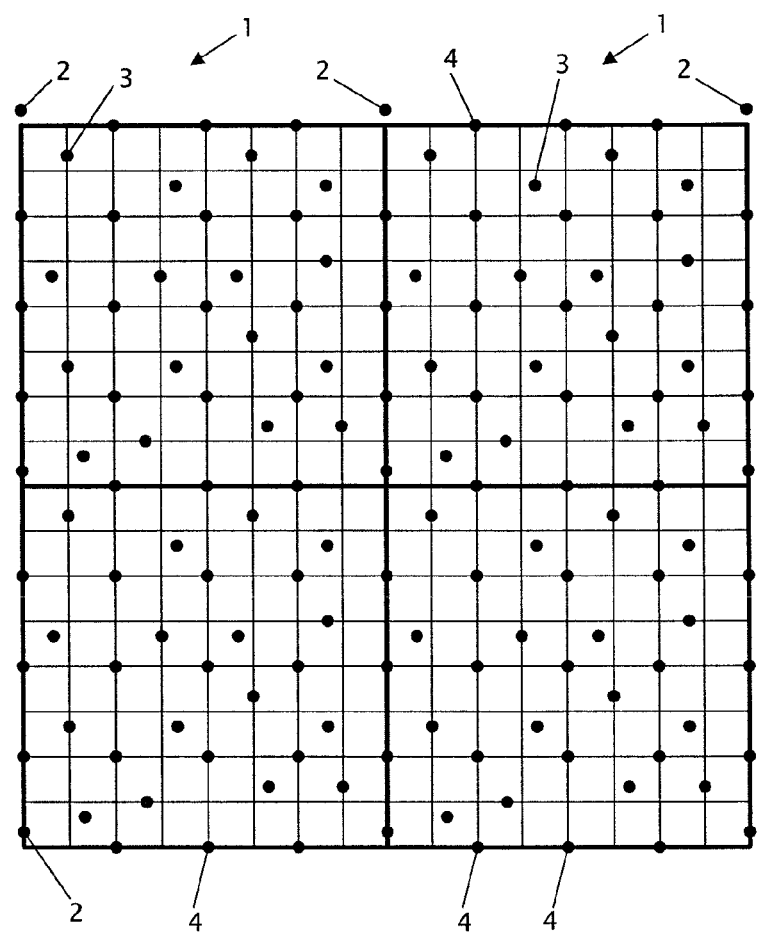
FIG. 2 is an explanatory diagram showing one example of a dot pattern.

FIG. 2 is an explanatory diagram showing GRID1, which is one example of the dot pattern of the present invention.

Note that grid lines in vertical and horizontal directions shown in these figures are drawn for convenience of explanation, and do not appear on an actual print surface. It is preferable that a key dot 2, an information dot 3, a reference grid point dot 4, and the like that constitute a dot pattern 1 are printed with invisible ink that absorbs infrared ray or carbon ink when a scanner as the imaging means has an infrared-ray irradiating means.

Figure 3:
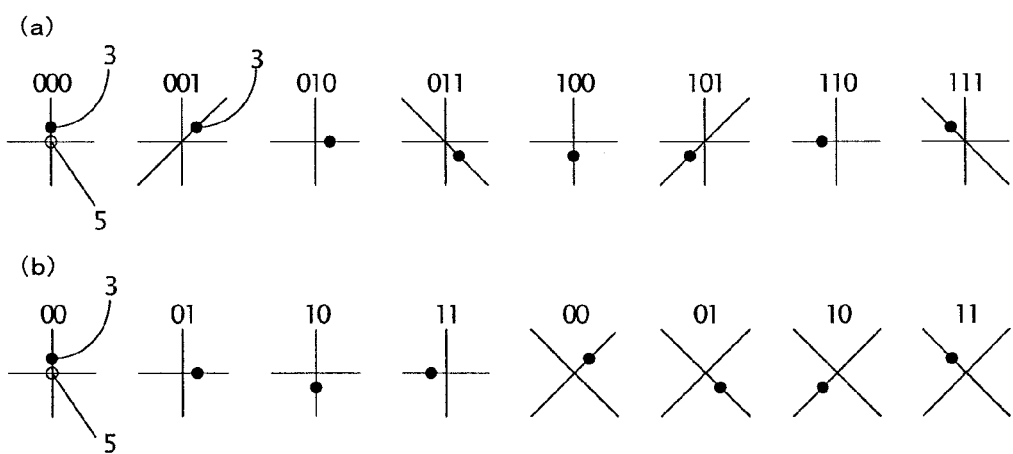
FIG. 3 is an enlarged view showing one example of an information dot of the dot pattern.

FIG. 3 is an enlarged view showing one example of the information dot of the dot pattern and a bit indication of the data that is defined thereto. FIGS. 4(a) and (b) are explanatory diagrams showing the information dots with the key dot arranged in the center.

An information input output method using the dot pattern of the present invention is implemented by creation of the dot pattern 1, recognition of the dot pattern 1, and a means to output information and a program from this dot pattern 1. In other words, the dot pattern 1 is captured by a camera as image data, and the reference grid point dots 4 are first extracted. The key dot 2 is then extracted based on the fact that no dot is present at a position at which the reference grid point dot 4 is supposed to appear. Subsequently, information area is digitalized to be extracted by extracting the information dots 3, to digitalize the information. Thus, using the digitized information, information and programs are output from this dot pattern 1. For example, information such as sound and a program is output from an information output device, a personal computer, a PDA, a mobile phone, or the like using the dot pattern 1.

To create the dot pattern 1 of the present invention, minute dots, specifically, the key dots 2, the information dots 3, and the reference grid point dots 4, are arranged according to a predetermined rule by a dot code generation algorithm so that information such as sound can be recognized therefrom. As shown in FIG. 2, in the block of the dot pattern 1 expressing information, the reference gird point dots 4 are arranged in 5×5 with reference to the key dots 2, and the information dots 3 are arranged around a virtual grid point 5 at the center surrounded by the four reference grid point dots 4. For this block, predetermined digital information is defined. In the example shown in FIG. 2, a state where four blocks (inside heavy line frame) of the dot pattern 1 are aligned is shown. The dot pattern 1 is, of course, not limited to be four blocks.

Single information and a single program that correspond to a single block can be output. Alternatively, single information and a single program that correspond to a plurality of blocks can be output.

The reference grid point dots 4 enables correction at the time of capturing the dot pattern 1 as image data with a camera, for distortion of a lens of the camera or imaging obliquely, expansion and contraction of a paper surface, warp of a surface of a medium, distortion at the time of printing. Specifically, a correction function $(X_n, Y_n)=f(X_n', Y_n')$ to convert a distorted rectangle formed with four reference grid point dots 4 into an original square is calculated. The information dots 3 are corrected using the same function and a correct vector of the information dot 3 is acquired.

If the reference grid point dots 4 are arranged in the dot pattern 1, distortion caused by a camera-related factor is corrected in image data obtained by capturing the dot pattern 1 with the camera; therefore, even when the image data of the dot pattern 1 is captured using a widely used camera on which a lens with high distortion is mounted, the dot pattern 1 can be accurately recognized. Furthermore, even when the dot pattern 1 is captured slanting a camera relative to a surface of the dot pattern 1, the dot pattern 1 can be accurately recognized.

The key dots 2 are, as shown in FIG. 2, dots arranged at positions shifted in a predetermined direction from the four reference grid point dots 4 at four corners of the block. This key dot 2 is a representative point of the dot pattern 1 corresponding to one block indicating the information dots 3, and is, for example, a dot arranged at a position shifted upward for 0.1 mm from the position of the reference grid point dot 4 at each of the four corners of the block of the dot pattern 1. When the information dot 3 expresses XY coordinates, a position that is shifted downward for 0.1 mm from the key dot 2 is to be a coordinate point. However, this value is not limited thereto, and is variable depending on the size of the block of the dot pattern 1.

The information dot 3 is a dot from which various kinds of information are recognized. This information dot 3 is arranged around the key dot 2 as the representative point, and is arranged at an endpoint of a vector whose starting point is the virtual grid point 5 that is the center of an area surrounded by the four reference grid point dots 4. For example, this information dot 3 is surrounded by the reference grid point dots 4, and a dot 0.1 mm apart from the virtual gird point 5 is rotated clockwise by 45° to be arranged in eight directions since the dot has direction and length expressed by a vector, thereby expressing 3 bits. Therefore, with the dot pattern 1 of one block, 3 bits×16=48 bits can be expressed.

FIG. 3(*b*) shows a method of defining the information dot 3 having 2 bits for each grid in the dot pattern shown in FIG. 2, and information of 2 bits each is defined therein by shifting the dot in + directions and in × directions. Thus, information of 48 bits can be defined originally, however, data can be given for 32 bits each by dividing the data depending on a use. By combining the + directions and in × directions, 216 (approximately 65000) types of dot pattern formats can be obtained at the maximum.

While 3 bits are expressed by arranging in 8 directions in the example shown in the figure, it is not limited thereto, and 4 bits can be expressed by arranging in 16 directions. Thus, it is needless to say that various modifications can be made.

A diameter of the key dot 2, the information dot 3, or the reference grid point dot 4 is preferable to be around 0.05 mm, considering the appearance, the printing accuracy with respect to quality of paper, a resolution of a camera, and optimal digitalization.

Further, an interval between the reference grid point dots 4 is preferable to be around 0.5 mm in vertical and horizontal directions, considering required amount of data with respect to an imaging area and misidentification of the respective dots 2, 3, and 4. A shifted amount of the key dot 2 is preferable to be about 20% of an interval of grids, considering misidentification with the reference grid point dot 4 and the information dot 3.

An interval between this information dot 3 and the virtual grid point 5 that is surrounded by the four reference grid point dots 4 is preferable to be about 15% to 30% of a distance between the virtual grid points 5 adjacent to each other. This is because if the distance between the information dot 3 and the virtual grid point 5 is smaller than this interval, the dots are likely to be recognized as a large unit, resulting in undesirable appearance as the dot pattern 1. On the other hand, if the distance between the information dot 3 and the virtual grid point 5 is larger than this interval, it becomes difficult to identify which one of the adjacent virtual grid points 5 is the center of the vector given to the information dot 3.

Figure 4:
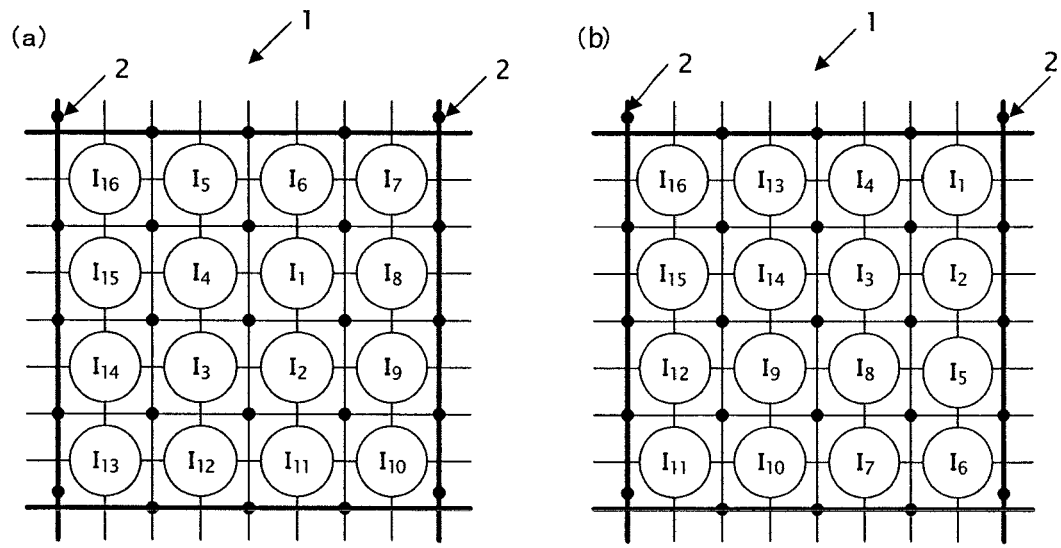
FIG. 4 is an explanatory diagram showing arrangement of the information dot.

For example, as shown in FIG. 4(*a*), a grid interval where the information dots 3 $I_1$ to $I_{16}$ are arranged clockwise from the center of the block is 0.5 mm, and 3 bits×16=48 bits are expressed with 2 mm×2 mm.

Sub-blocks that separately have independent information content and that are not affected by other information content can be further arranged in a block. FIG. 4(*b*) shows this, and sub-blocks $[I_1, I_2, I_3, I_4]$, $[I_5, I_6, I_7, I_8]$, $[I_9, I_{10}, I_{11}, I_{12}]$, $[I_{13}, I_{14}, I_{15}, I_{16}]$ constituted of four information dots 3 are configured to express each separate data (3 bits×4=12 bits) with the information dot 3. By thus arranging the sub-blocks, it becomes possible to perform error check in a sub-block unit with ease.

The direction of the vector (rotation direction) of the information dot 3 is preferable to be determined uniformly every 30 degrees to 90 degrees.

Figure 5:
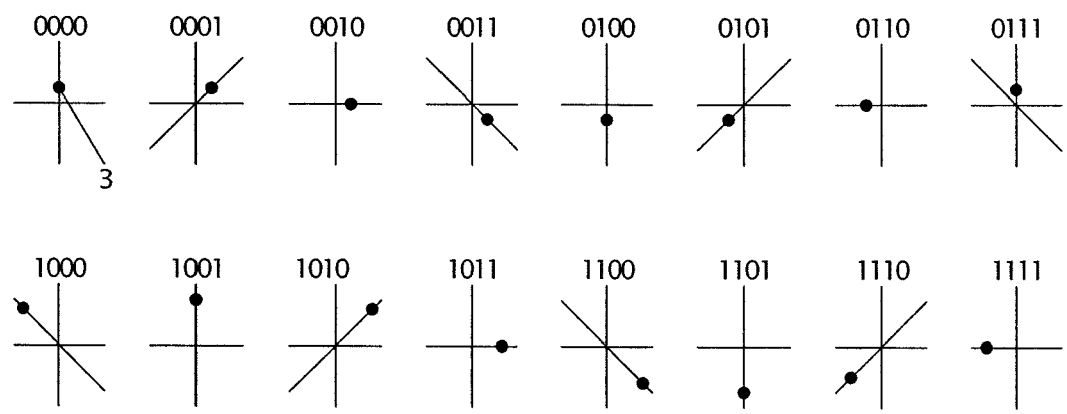
FIG. 5 shows an example of the information dot and a bit indication of data that is defined therefor, and shows another embodiment.

FIG. 5 shows an example of the information dot 3 and a bit indication of data that is defined therefor, and shows another embodiment.

Moreover, for the information dots 3, if two types being long and short relative to the virtual grid point 5 that is surrounded by the reference grid point dots 4 are used and eight directions are used for the direction of the vector, 4 bits can be expressed. It is preferable that the long one has length of 25% to 30% of a distance between the virtual grid points 5 adjacent to each other, and the short one has length of 15% to 20% thereof. A distance between the centers of the information dots 3 of long and short is preferable to be longer than the diameter of these dots.

The information dot 3 that is surrounded by four dots of the reference grid point dots 4 is preferable to be 1 dot, considering the appearance. However, when it is desired to increase the amount of information regardless of the appearance, by assigning 1 bit for each vector to express the information dot 3 with a plurality of dots, a large amount of information can be held. For example, with vectors in eight directions in a concentric circle, the information dot 3 surrounded by four dots of the grid dots 4 can express information of $2^8$, and with $1^6$ information dots in one block, information is to be $2^{128}$.

Figure 6:
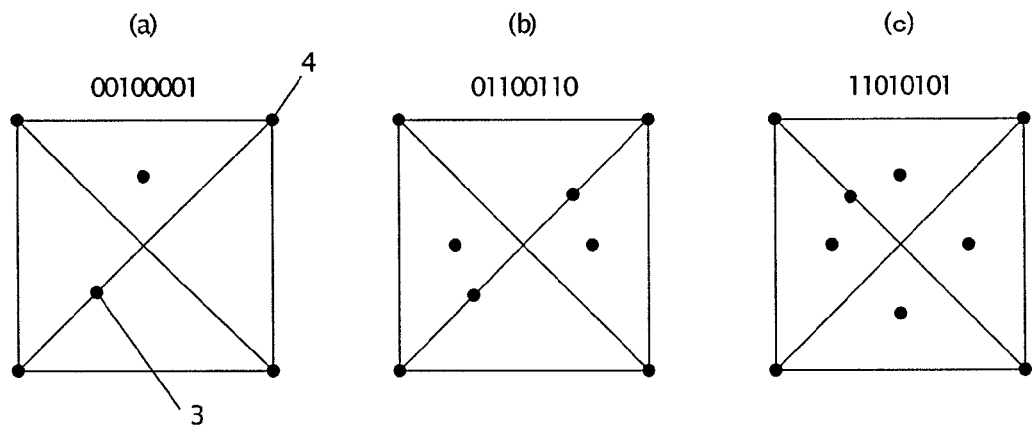
FIG. 6 shows an example of the information dot and a bit indication of data that is defined therefor; (a) shows an example with two dots arranged, (b) shows an example with four dots, and (c) shows an example with five dots.

FIG. 6 shows an example of the information dot and a bit indication of data that is defined therefor; (a) shows an example with two dots arranged, (b) shows an example with four dots, and (c) shows an example with five dots.

Figure 7:
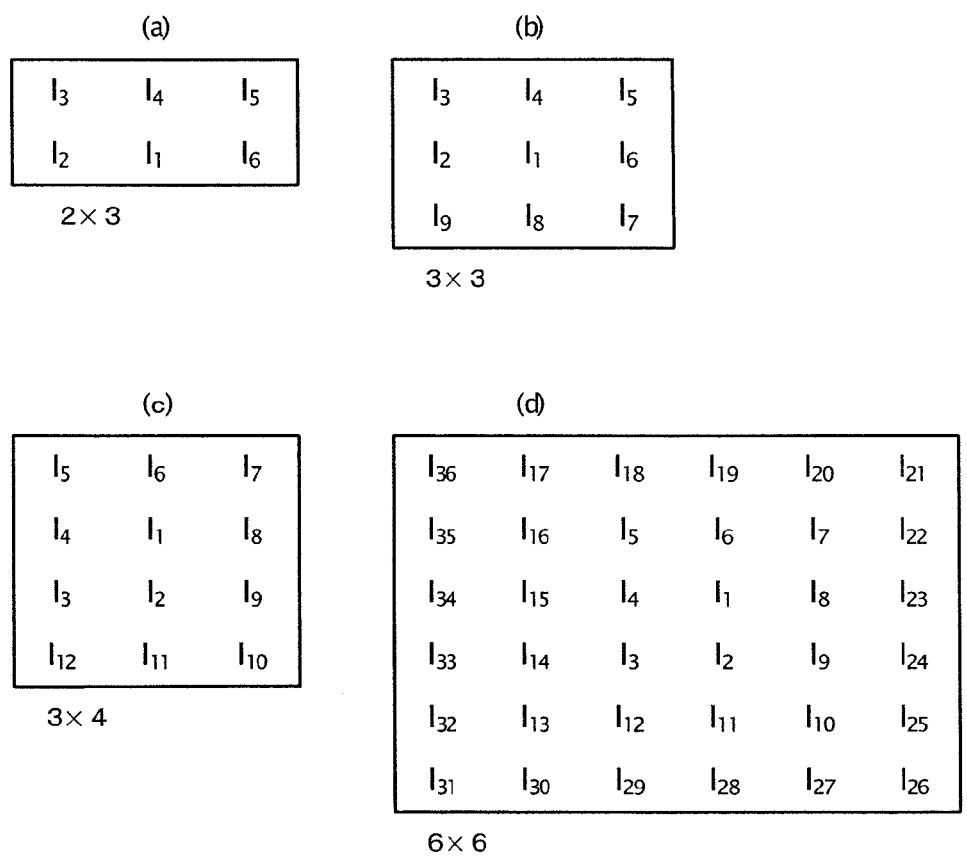
FIG. 7 shows a modification of the dot pattern; (a) is a schematic diagram of an example of a 6 information dots type, (b) is a schematic diagram of an example of a 9 information dots type, (c) is a schematic diagram of an example of a 12 information dots type, and (d) is a schematic diagram of a 36 information dots type.

FIG. 7 shows a modification of the dot pattern; (a) is a schematic diagram of a 6 information dots type, (b) is a schematic diagram of a 9 information dots type, (c) is a schematic diagram of a 12 information dots type, and (d) is a schematic diagram of a 36 information dots type.

Figure 8:
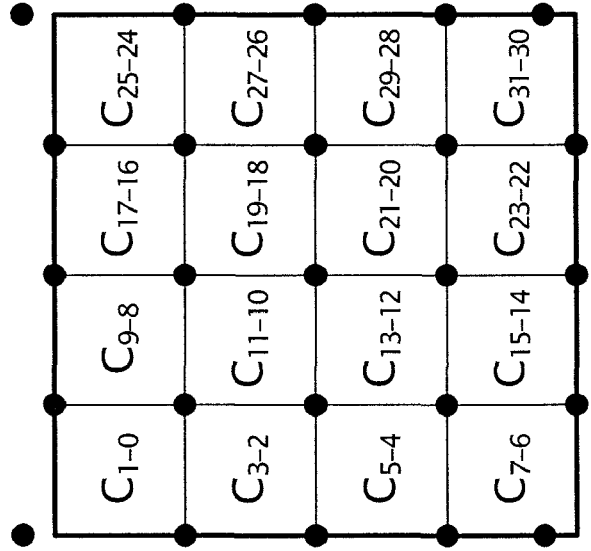
FIG. 8 is a diagram for explaining a dot code format in a controller area.

The dot pattern 1 shown in FIG. 2 and FIG. 4 is an example in which 16 (4×4) information dots 3 are arranged in one block. However, the information dot 3 is not limited to be 16 in one block, and it can be changed to various numbers. For example, depending on the amount of required information or the resolution of a camera, (a) a dot pattern in which 6 (2×3) information dots 3 are arranged in one block, (b) a dot pattern in which 9 (3×3) information dots 3 are arranged in one block, (c) a dot pattern in which 12 (3×4) information dots 3 are arranged in one block, and (d) a dot pattern in which 36 information dots 3 are arranged in one block can be used. Next, FIG. 8 and FIG. 9 are explanatory diagrams showing relation between a dot pattern, a code value, and XY coordinates.

As shown in FIG. 8(b), the dot pattern is constituted of 4×4 block areas, and is sectioned to $C_{1-0}$ to $C_{31-30}$ in this block. A dot code format of each area is shown in FIG. 8(a) and FIG. 9. FIG. 8(a) shows a dot code format of a controller area. In $C_0$ to $C_{15}$, an operation code is registered, in $C_{16}$ to $C_{29}$, a controller ID is registered, and $C_{30}$ to $C_{31}$, parity is registered.

FIG. 9 shows a dot code format of an XY coordinates area of a paper tablet and the like. In $C_0$ to $C_7$, a Y coordinate is registered, in $C_8$ to $C_{15}$, an X coordinate is registered, in $C_{16}$ to $C_{29}$, a paper ID is registered, and in $C_{30}$ to $C_{31}$, parity is registered.

Thus, in the dot pattern, together with an X coordinate and a Y coordinate, code information (code values) corresponding thereto can be registered in a 4×4 gird area.

<Explanation of Dot Pattern: Direction Dot>

FIG. 10 and FIG. 11 are diagrams for explaining another example of the dot pattern.

FIGS. 10(a) and (b) show an example in which a direction of a block is defined by arranging the information dot 3 only in specific grid areas (direction areas) in a different direction from other gird areas in a dot pattern of a block constituted of 3×3=9 grid areas, in the dot patterns described in FIG. 2 to FIG. 7.

Specifically, as shown in FIG. 10(a), in each of a grid area 34a at the bottom left, a grid area 34b in the center, and a grid area 34c at the bottom left, the information dot 3 is arranged in vertical and horizontal directions relative to the center, and in other grid areas, the information dot 3 is arranged in a diagonal direction relative to the center. By thus arranging the grid areas 34a, 34b, and 34c, it is possible to recognize that the block is directed upward from a triangular shape formed by connecting these gird areas, in other words, relation of the vertex 34b with respect to the base formed with 34a and 34c.

As described, with arrangement relation (triangle in this example) of the grid areas 34a, 34b, and 34c in which the direction of arrangement of the information dot 3 in the block is varied (the information dot is arranged in the vertical and horizontal directions relative to the center), the direction of the block can be defined. Thus, the information dots 3 can be arranged in all grid areas in a block. Therefore, the information dot 3 can be arranged in all grid areas without using a grid area for a key dot.

FIG. 10(b) shows a state where the blocks shown in FIG. 10(a) are connected two each in the vertical and horizontal directions.

FIGS. 11(a) and (b) are diagrams showing an arranging state of the information dots 3 that correspond to FIGS. 10(a) and (b).

FIRST EMBODIMENT

Mask Specification Method

Next, a technique of specifying a mask area and associating an address thereto is explained referring to FIG. 12 to FIG. 19.

(Paper Controller)

Figure 12:
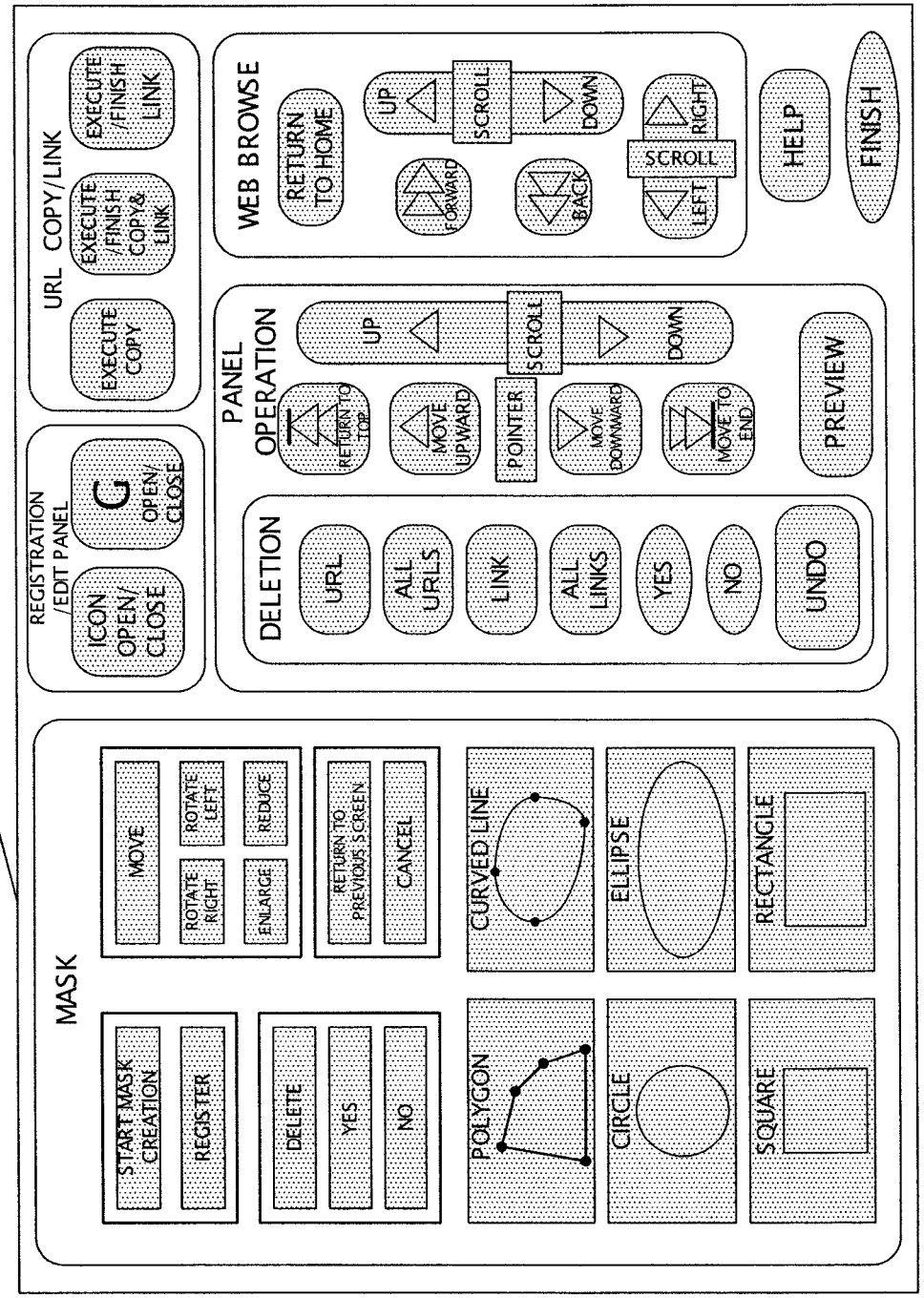
FIG. 12 is an explanatory diagram showing a paper controller for mask creation/web link.

FIG. 12 shows a paper controller to set a mask area on a sheet on which a dot pattern is printed. On the sheet, an image on a display screen is also printed, superimposed on the dot pattern. Calibration has been performed on the sheet and the display image.

The calibration is a work required when a sheet as a supply product on which a dot pattern indicating XY coordinates is printed in advance is provided.

Specifically, when an image displayed on the display device is printed on a sheet on which XY coordinates are printed in advance, the image displayed on the display device and the image printed on the sheet (XY coordinates) are displaced from each other. Therefore, it is required to calculate adjustment values. This is the calibration. Accordingly, when the image displayed on the display device is printed together with the dot pattern on a blank sheet, the display image and the image to be printed match with each other from the beginning, the calibration work is not required.

For calibration, at the time of printing the image displayed on the display device on a sheet on which XY coordinates are printed as a dot pattern, calibration marks as shown in FIGS. 31(a) and (c) are printed.

In actual calibration, at least two calibration marks are used, the calibration marks are sequentially read by a scanner, thereby performing the calibration. When the read calibration marks are X and Y, a position at an actual display device can be calculated by x=f(X), y=f(Y).

After that, xy coordinates values that are calculated using this expression from the XY coordinates read from the sheet can be used.

The calibration mark can be provided at three points or more to increase the accuracy.

In each icon image (each area shown with rectangle or triangle) on this paper controller, a code value is printed as a dot pattern. By imaging (touching) these icon areas with a scanner, corresponding code values are converted into commands by a personal computer to be given to an application program.

For example, a mask creation processing can be performed with this paper controller.

First, when a user inputs (images) selection of "start mask creation" in a mask creation area shown in a left half of the paper controller with a scanner, a creation screen is displayed on a screen of the display device. The user selects (images) with the scanner, an icon (for example, a polygon, a curved line, etc.) of a shape wished to be created with the scanner.

Subsequently, by scanning a boundary area of the printed image that is wished to be a mask area on the sheet, a mask is created.

To move the created mask, "move" is selected, and then the position on the paper corresponding to a destination position is selected (imaged) with a scanner.

To rotate the created mask left, "rotate left" is selected (imaged) with the scanner, and to rotate right, "rotate right" is selected. Moreover, to enlarge the created mask, "enlarge" is selected (imaged) with the scanner, and to reduce the mask, "reduce" is selected.

To go back to a previous screen to redo the work on the display device, a "undo" area in the mask creation area is selected (imaged) with the scanner. To discontinue the mask creation, "cancel" is selected (imaged) with the scanner.

Finally, when the mask creation is completed, "register" is selected (imaged) with the scanner.

If "delete" area is selected (imaged) with the scanner, "would you like to delete?" is displayed on the display device. If a "yes" area in the mask creation area is selected (imaged) with the scanner, a selected mask is deleted. When deletion is not to be performed, "no" is selected (imaged) with the scanner.

For example, after the "start mask creation" icon in the mask creation area shown in the left half of the paper controller is imaged (touched) with the scanner, and a figure (polygon, curved line, etc.) as the mask area is selected (imaged), a desirable Internet address (URL) is copied by imaging (touching) a "copy" icon in a "URL copy/link" area with the scanner. Subsequently, an "execute/terminate copy & link" icon is selected (imaged) with the scanner to associate the URL to the mask area specified previously. This enables a browser program to access the URL that has been associated, when the mask area on the sheet is selected (imaged) with the scanner.

Such a link between a mask area and a URL can be displayed on a panel that is displayed on the screen of the display device. As for the panel displayed on the screen of the display device, it is configured to be able to delete a link of a URL, to move a pointer on the panel upward and downward, or to scroll a panel screen, by selecting (imaging) each icon in a "panel operation" area on the paper controller with the scanner.

Further, movement (upward and downward, back and forward operation to a previously opened page) of a screen of the browser program and scrolling are enabled by selecting (imaging) each icon in a "web browse" area on the paper controller with the scanner. These operations are enabled by the application program analyzing a code value that has been registered in each icon area in the form of a dot pattern, and performing an interrupt with respect to the browser program.

FIG. 13 shows contents of a dot code/command table that is registered in the hard disk unit.

The table is used for the paper controller shown in FIG. 12. In each control area (area for the paper controller) in the paper controller, a dot pattern is printed. Each dot pattern corresponds to a dot code, and the dot code corresponds to a processing command. When the dot pattern is specified (imaged) with the scanner, a processing command of any kind is to be performed. For example, the mask creation or the mask registration is to be instructed.

Next, specific examples of the mask specification processing are explained referring to FIG. 14 to FIG. 19.

Figure 14:
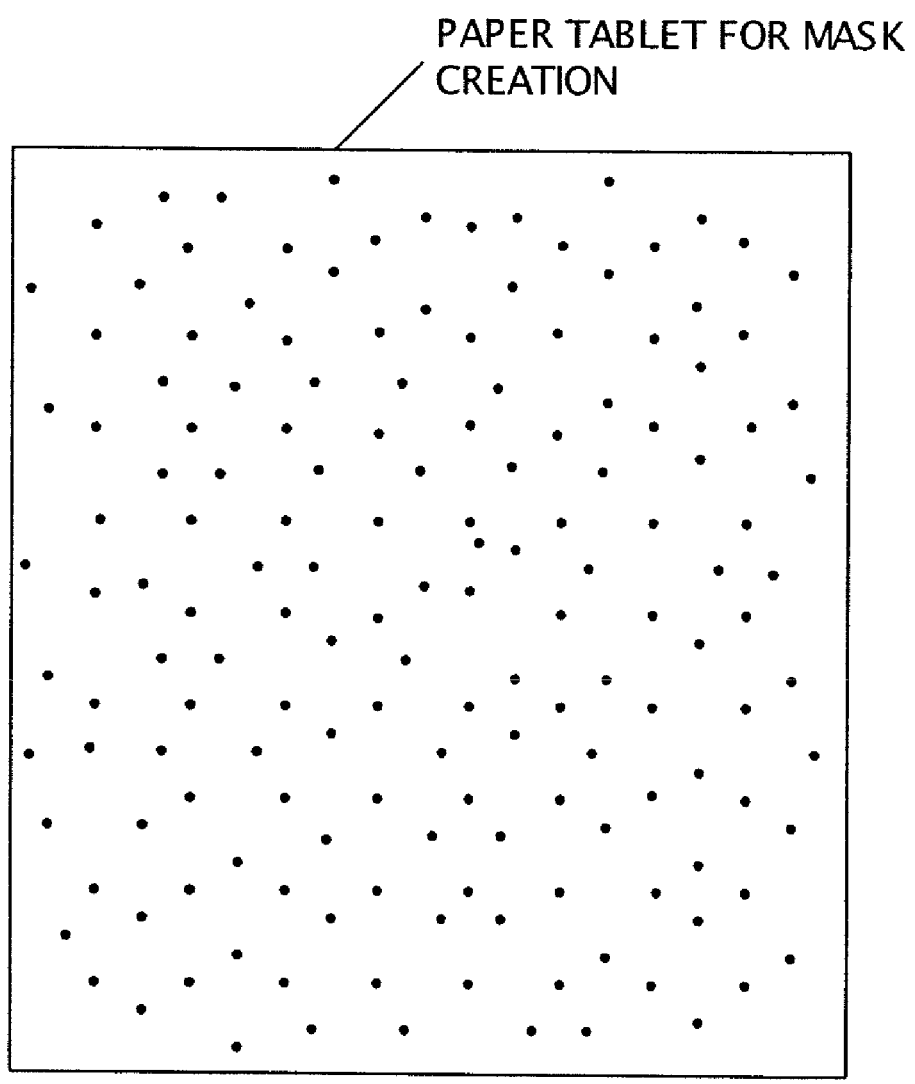
FIG. 14 is an explanatory diagram of the mask specification processing, and is a front view for explaining about the paper tablet for mask creation.
Figure 15:
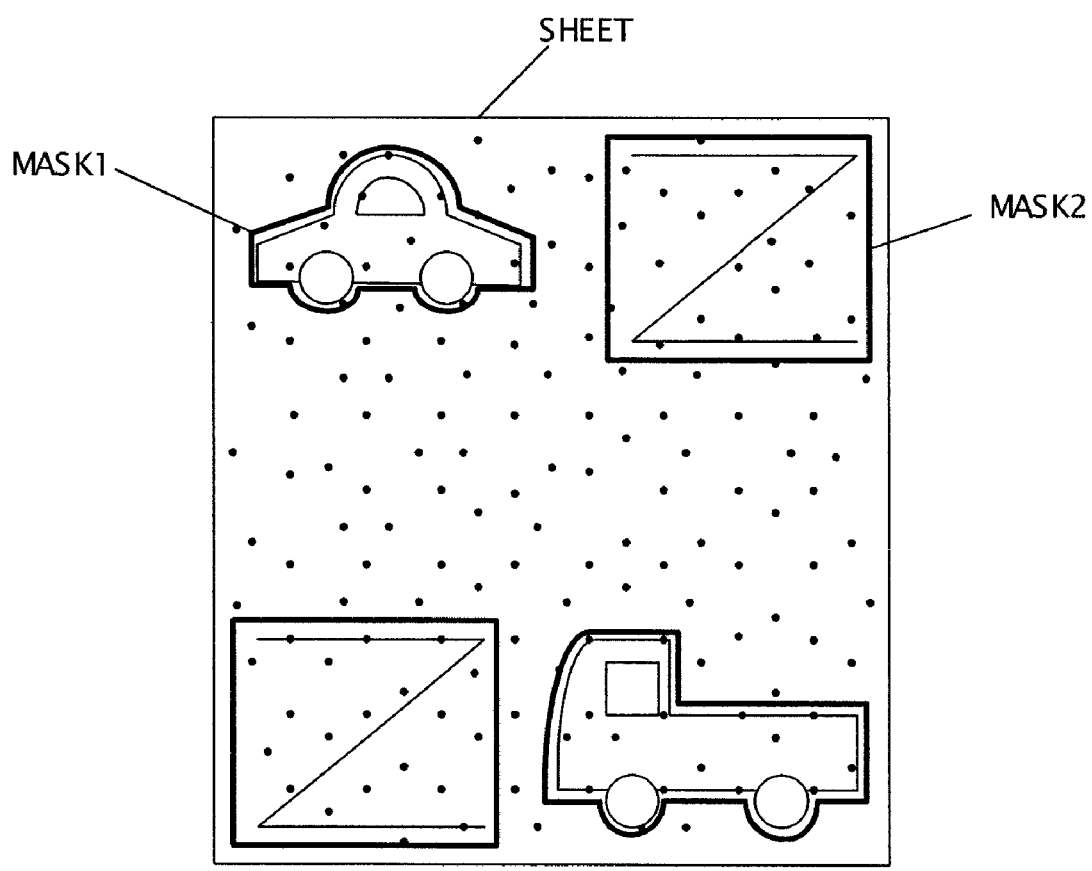
FIG. 15 is an explanatory diagram of the mask specification processing, and shows a method of specifying a mask.

FIG. 14 shows a paper tablet for mask creation. First, an image displayed on a screen of a display device is printed on a sheet on which a dot pattern has been printed. As a result, as shown in FIG. 15, the paper tablet for the mask creation, and a figure or a document are printed in a superimposed manner. The calibration is then performed to adjust positional relation between the sheet and the image on the display device.

Subsequently, an outer border of the area specified as the mask area is scanned with the scanner by the operation described above on the sheet on which the image is printed, using the paper controller shown in FIG. 12.

For example, when a drawing of a vehicle at the top left of the sheet shown in FIG. 15 is wished to be filled, scanning is performed along an outer border of the drawing of a vehicle on the sheet with the scanner. According to the outer border thus scanned, a mask flag is set for an area surrounded by this outer border in a mask table (see FIG. 16) set in the hard disk unit (HD). As shown in FIG. 16, in the mask table, mask flags of a mask number 1 and a mask number 2 are set.

The application program refers to this mask table, thereby determining which part of the image is to be processed.

FIG. 17 shows contents of a mask/address table set in the hard disk unit (HD).

In the mask/address table, addresses are registered corresponding to the mask numbers. For example, an Internet address (URL) is registered for a mask 1, and a local drive and an executable file are registered for a mask 2. Such registration is carried out by performing copy and link of a URL using the paper controller as described above.

For example, when specification of the mask 1 area is input with the scanner, the browser program starts and accesses an Internet address (URL) that is registered in this mask/address table.

Moreover, when specification of the mask 2 area is input with the scanner, a predetermined execution program (for example, an image processing program, etc.) of a local C drive starts.

Figure 18:
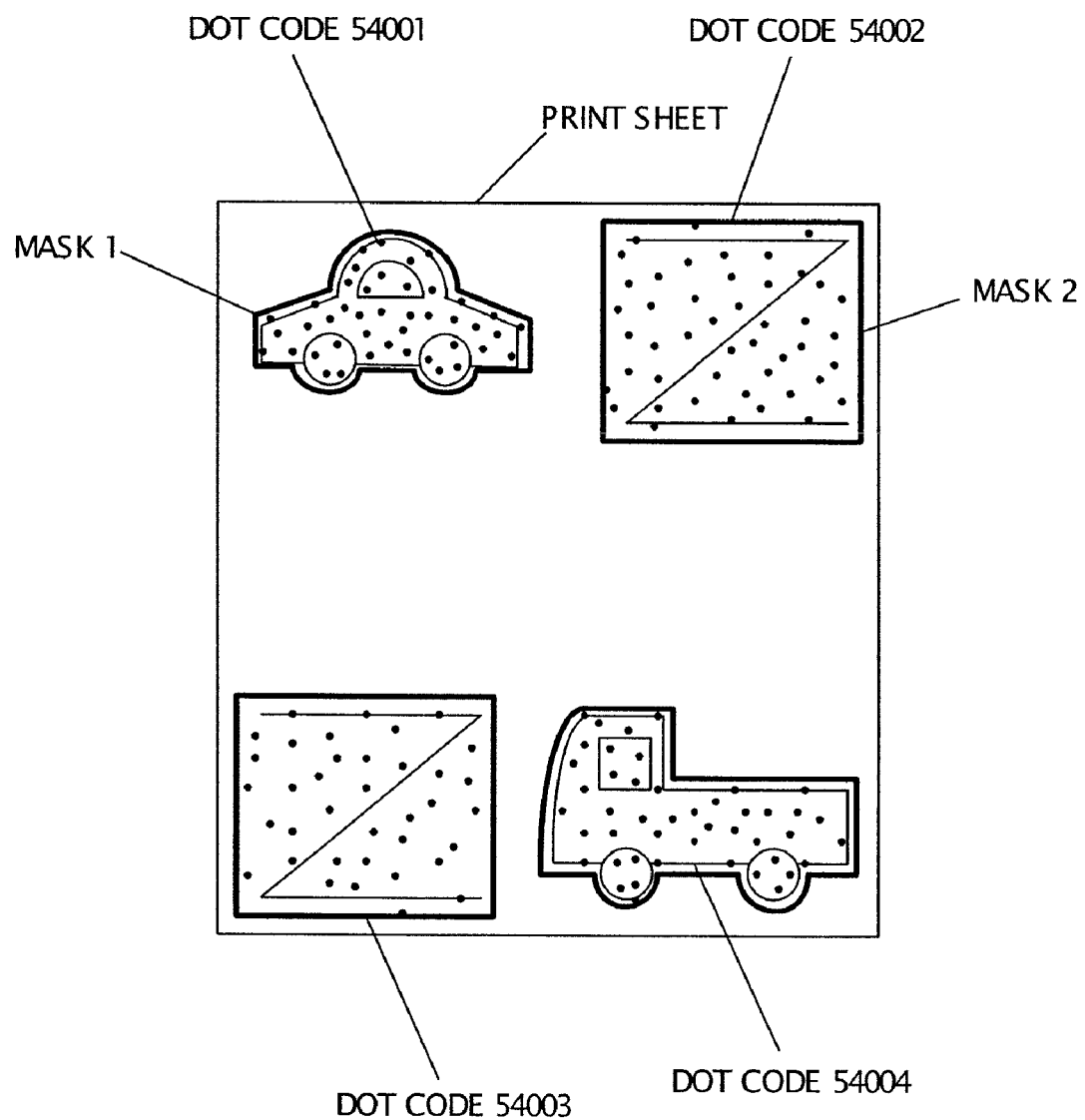
FIG. 18 is a diagram for explaining another embodiment of the mask specification processing.

FIG. 18 to FIG. 19 are diagrams for explaining another embodiment of the mask specification method.

In the example shown in FIG. 14 to FIG. 17, the mask specification is performed after the image displayed on the screen of the display device is printed on the paper tablet for mask creation.

In the present embodiment, a user scans an outer border of the image using a mouse or the like to perform mask specification on the screen of the display device. Printing is performed thereafter. As a result, the dot pattern is printed only in the area that is specified to be masked, and the dot pattern is not printed in other areas.

Thus, the dot pattern is printed only in a required area as shown in FIG. 18.

FIG. 19 is a diagram for explaining a table set in the hard disk unit (HD).

FIG. 19(a) shows contents of a mask/dot code table.

In the mask/dot code table, a dot code is registered corresponding to the mask number. For example, a dot code 54001 is registered for the mask 1, and a dot code 54002 is registered for the mask 2.

FIG. 19(b) shows contents of a dot code/address table.

When a dot code is registered in FIG. 19(a), an address corresponding to the dot code is registered. The address is registered by a user performing copy and link of a URL using the paper controller shown in FIG. 12, or by directly inputting the address with a keyboard.

Thus, when the area of the mask 1 is specified with the scanner, the browser program starts and accesses an Internet address (URL) registered in the dot code/address table.

Furthermore, when the area of the mask 2 is specified with the scanner, a predetermined execution program (for example, an image processing program, etc.) of a local C drive starts.

SECOND EMBODIMENT

Modeling

Next, a mask processing technique when an area of a part of the image displayed on the display device is specified, and image correction and processing such as a three-dimensional processing of the image, coloring, and correction is performed within the specified area is explained referring to FIG. 20 to FIG. 30.

<Modeling Controller>

Figure 20:
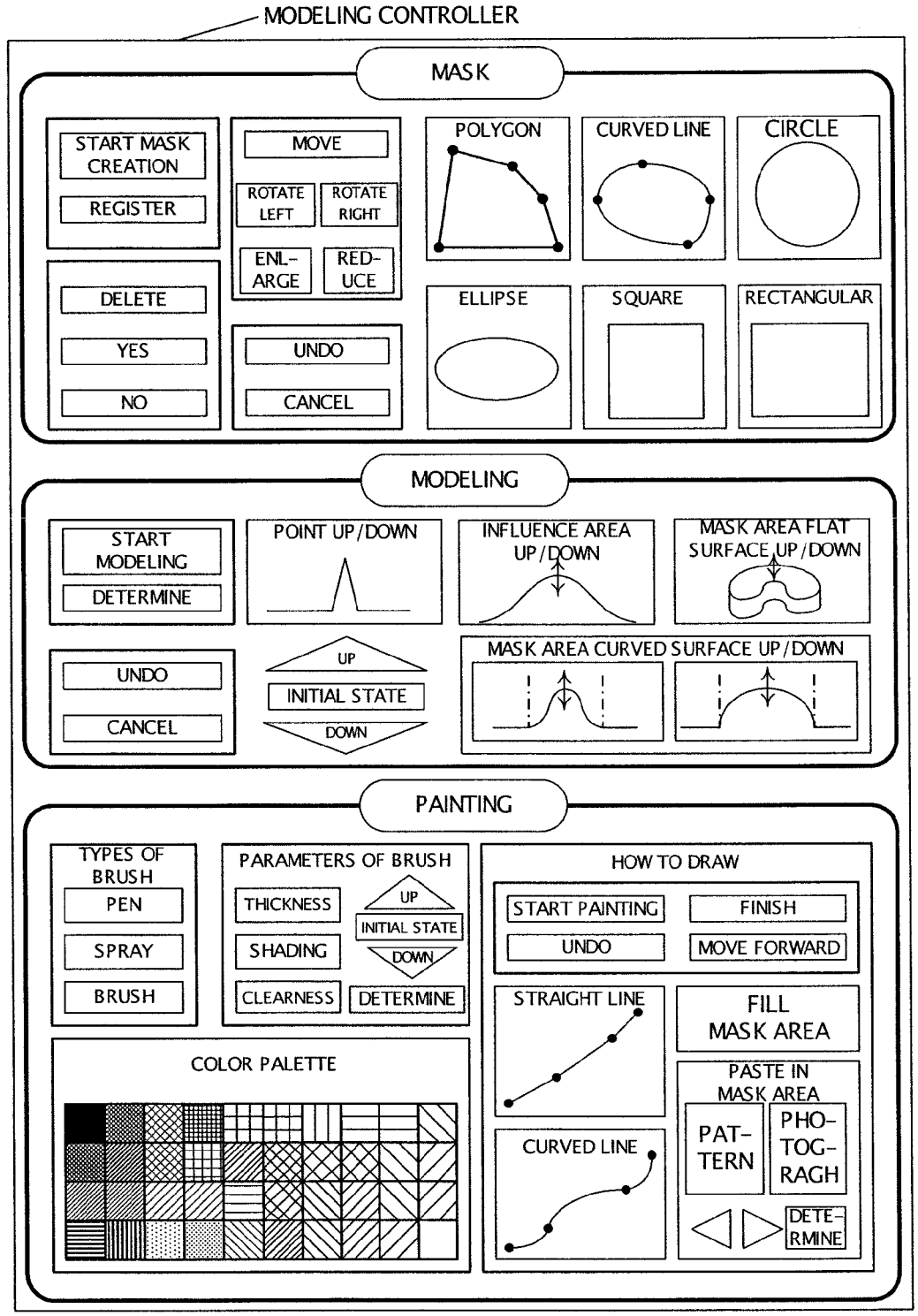
FIG. 20 is an explanatory diagram of a modeling controller.

FIG. 20 shows a sheet for control (modeling controller) when a mask area is created and three-dimensional modeling or painting is performed on the area.

In this modeling controller, areas in which respective instruction commands are printed are printed in areas sectioned into upper, middle, and lower rows. In these areas, dot patterns (not shown) indicating coordinates or codes are printed. Therefore, by specifying (imaging) each area with the scanner, the dot pattern printed in the area is converted into coordinates or a code value, to be read by the central processing unit (CPU), and a command corresponding thereto is to be executed by the application program.

In the mask creation instruction area in the upper row, an area for instructing the start of mask creation (start mask creation) or a mask figure such as a polygon, a curved line, and a circle can be specified.

In an area for instructing a modeling operation in the middle row, modeling in a mask area that has been specified in the mask creation instruction area is to be instructed. Specifically, a three-dimensional processing toward a Z direction on an image data such as a map is performed, and the modeling in upward and downward directions (Z direction) at a point specified with the scanner is possible. The three-dimensional processing is enabled using various functions, and such a three-dimensional modeling to make an entire mask area appear in relief in the Z direction, or to make a central part rise in the +Z direction in a bell shape is possible.

A paint instruction area in the lower row enables input of instructions for coloring a mask area with the scanner.

Next, specific examples of the mask creation, the modeling, and the painting using the modeling controller described in FIG. 20 are explained.

(Mask Creation)

First, when a user selects (images) the "start mask creation" area in the modeling controller with the scanner, a creation screen is displayed on the screen of the display device. The user selects (images) an icon of a figure wished to be created (for example, a polygon, a curved line, etc.) with the scanner.

Subsequently, a mask is created by scanning a boarder area for a wished mask area on the printed image on the sheet of the modeling controller.

To move the created mask, after selecting "move", a position on the sheet corresponding to a destination position is selected (imaged) with the scanner.

To rotate the created mask left, "rotate left" is selected (imaged) with the scanner, and to rotate right, "rotate right" is selected. Moreover, to enlarge the created mask, "enlarge" is selected (imaged) with the scanner, and to reduce the mask, "reduce" is selected.

To go back to a previous screen to redo the work on the display device, a "undo" area in the modeling controller is selected (imaged) with the scanner. To discontinue the mask creation, "cancel" is selected (imaged) with the scanner.

Finally, when the mask creation is completed, "register" is selected (imaged) with the scanner.

If "delete" area is selected (imaged) with the scanner, "would you like to delete?" is displayed on the display device. If a "yes" area in the modeling controller is selected (imaged) with the scanner, a selected mask is deleted. When deletion is not to be performed, "no" is selected (imaged) with the scanner.

(Modeling)

A user selects (images) a "start modeling" icon with the scanner to start modeling.

Next, a modeling method is selected. Specifically, either one of icons (areas), "point up/down", "influence area up/down", "mask area, flat surface up/down", and "mask area, curved surface up/down" is selected (imaged) with the scanner.

Subsequently, a position at which modeling is performed is determined. When a position wished to rise up on the sheet is selected (imaged) with the scanner, an intersection (point) of a mesh that is closest to the position selected (imaged) with the scanner on the sheet flashes on the screen of the display device. At this time, if "mask area, flat surface up/down" or "mask area, curved surface up/down" is selected as the modeling method, an outline of the mask flashes together with the point.

Modeling is then performed. The user selects (images) triangular icons of "up" and "down" with the scanner, to raise a mesh to perform modeling. A raised configuration is determined according to the modeling method selected in the above operation. To raise the mesh higher, or to dent deeper, the number of selection (imaging) with the scanner is increased, and consecutive tapping with the scanner on the sheet can be performed, for example.

Figure 21:
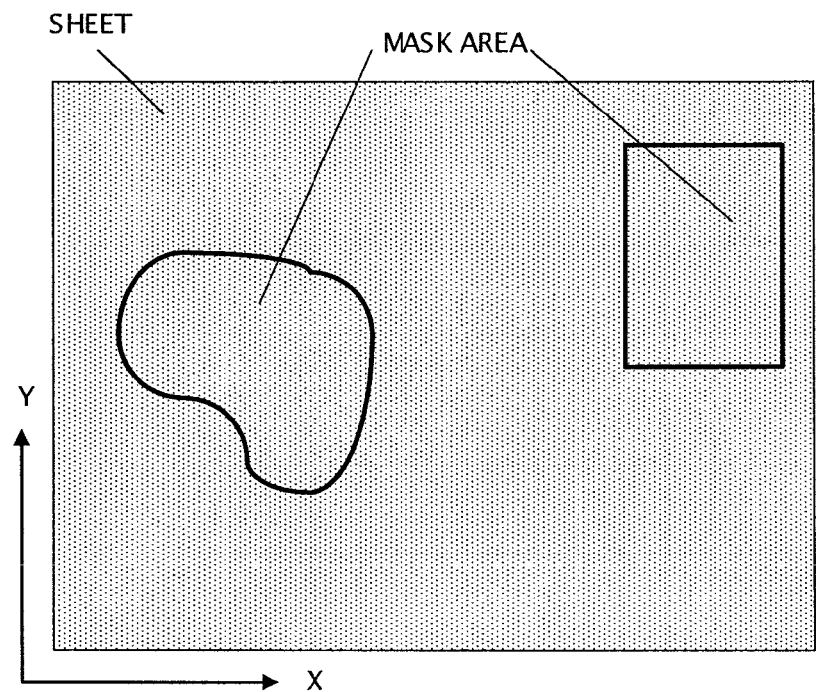
FIG. 21 is an explanatory diagram of a modeling processing, and shows a state in which masking has been performed on a sheet.
Figure 22:
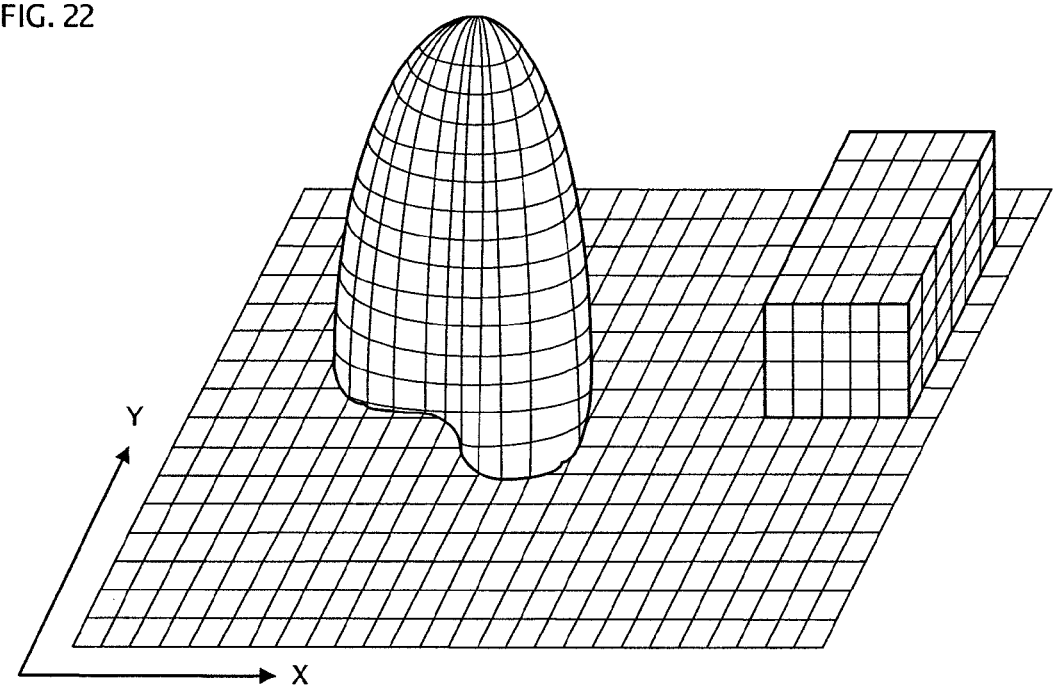
FIG. 22 is an explanatory diagram of the modeling processing, and shows a state in which modeling has been performed.

FIG. 21 and FIG. 22 are diagrams showing masking shapes and modeling for a raised shape in the Z direction corresponding thereto. In these diagrams, a figure on the left side shows a state in which "mask area, curved surface up/down" is selected (imaged) with the scanner and modeling to raise into a mountain shape (bell shape) is performed. On the other hand, a figure on the right side shows a state in which "mask area, flat surface up/down" is selected (imaged) with the scanner and modeling to raise into a cubic shape as a building is performed. At this time, specification of the mask can be performed by specifying an arbitrary point inside the mask shape with the scanner.

To go back to a previous operation to redo the work during the modeling, "undo" is selected (imaged) with the scanner, and to discontinue the modeling, "cancel" is selected.

When a desirable shape (a raised shape, a dent shape, etc.) is formed, "determine" is selected (imaged) with the scanner. Thus, the modeling is settled.

When the scanner is tilted relative to a vertical direction on the paper sheet, variations of light and shade are caused in a tilted direction in an imaging area. Therefore, by recognizing such variations with an image recognition program on the personal computer, the direction in which the scanner is tilted can be recognized. Based on this principle, by a grid grind operation of the scanner, in other words, rotation about a vertical line in a tilted state in which a certain inclination of an imaging optical axis with respect to the vertical line on the sheet, that is, by recognizing a change of an inclined state of an imaging optical axis, image processing displayed on the display device can be instructed.

For example, by rotating (grinding) a posterior end (upper end in FIG. 23(a)) of the scanner clockwise within a predetermined time period while fixing an imaging range to a certain point in a state where the scanner is tilted, the modeling to dent in the Z direction as shown in FIG. 23(b) can be performed.

On the other hand, by rotating (grinding) the posterior end (upper end in FIG. 24(a)) of the scanner counterclockwise within a predetermined time period, the modeling to raise in the Z direction as shown in FIG. 24(b) can be performed.

FIG. 25 to FIG. 30 are diagrams for explaining a method of recognizing inclination and rotation of the scanner.

Figure 24:
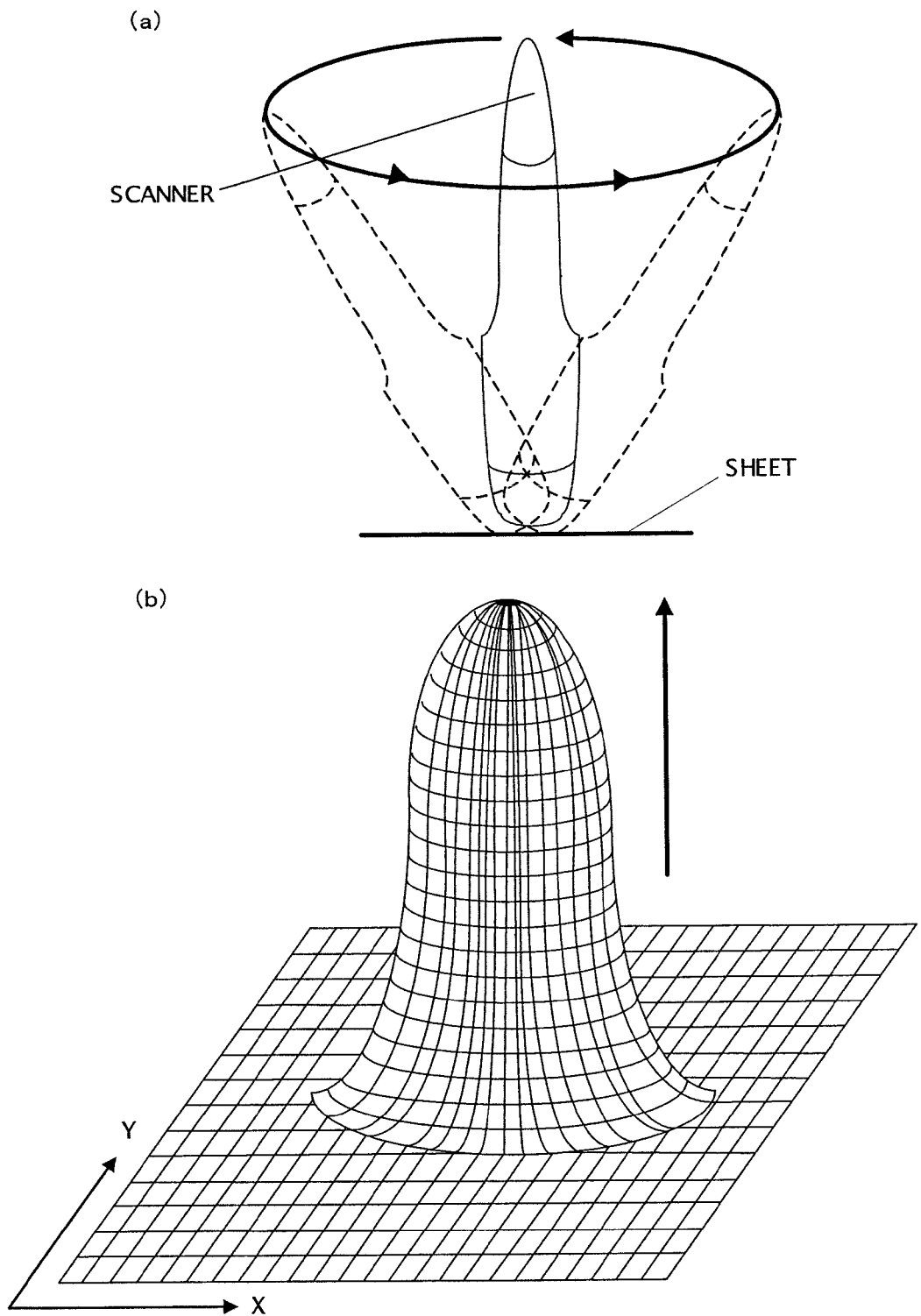
FIG. 24 is an explanatory diagram of a function of performing the modeling by rotating a scanner; (a) shows movement of the scanner, and (b) shows a processing to be done by the movement of the scanner.
Figure 25:
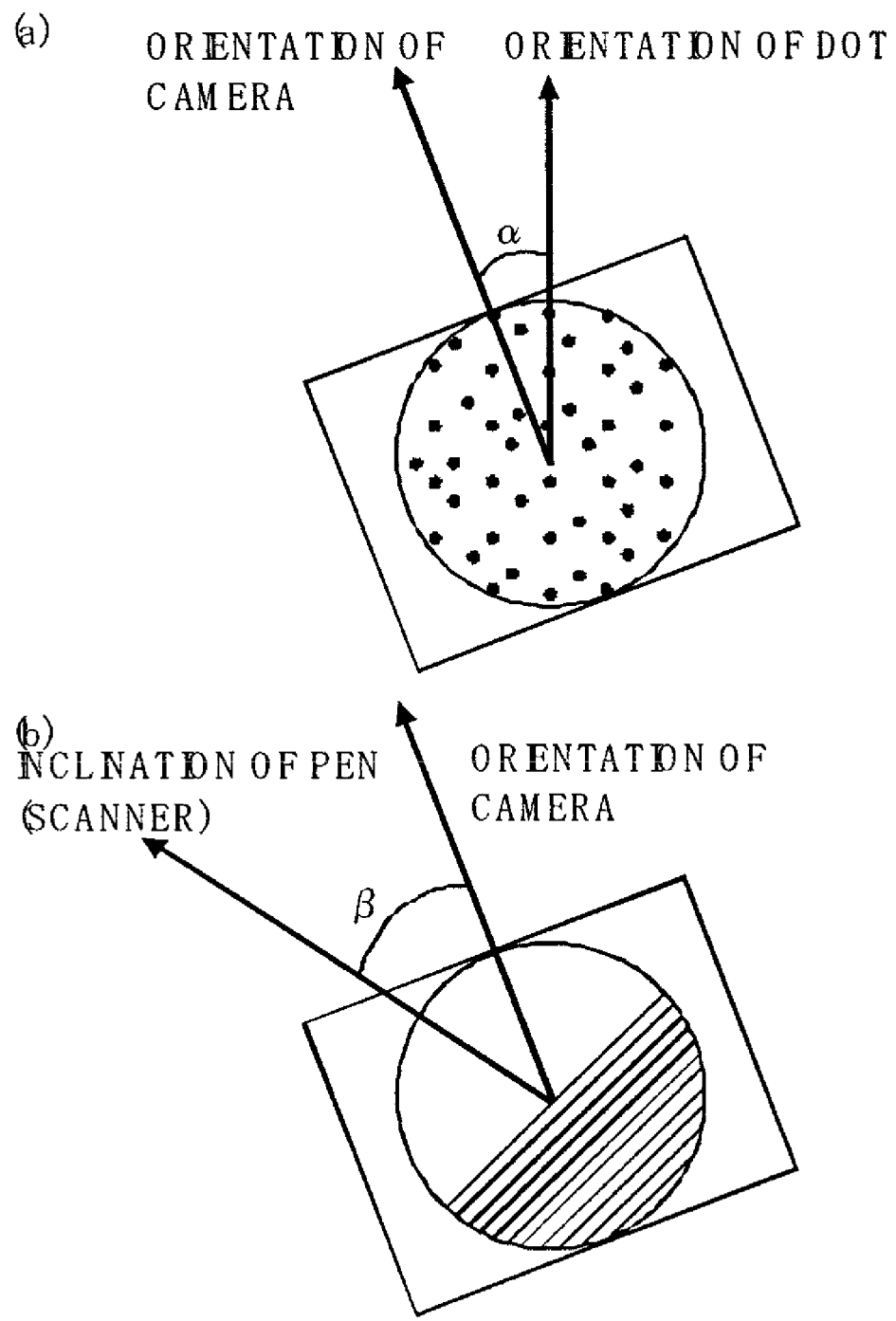
FIG. 25 is an explanatory diagram showing orientation and inclination of the scanner.

As shown in FIG. 25, the central processing unit recognizes light and shade of an image captured by the scanner, and recognizes that the scanner is moved as shown in FIG. 23 to FIG. 24 when an area of the light and shade changes relative to the center of the imaging.

FIG. 25 is a diagram explaining relation between then inclination of the scanner and an angle.

The dot pattern on the paper sheet is printed in a superimposed manner in the same direction as a vertical direction of the paper sheet. As shown in (a), an angle between the orientation of the dot pattern and the orientation of a camera in the scanner is α. Further, as shown in (b), an angle between the inclination of the scanner and the orientation of the camera when a user tilted the scanner is β. In this case, an angle γ between the orientation of the dot pattern and the inclination of the scanner is an angle at which the scanner is tilted relative to the surface of the paper. Therefore, the angle γ is expressed as

γ=α+β.

FIG. 26 to FIG. 27 are diagrams explaining a calculation method of light and shade of an image captured by the scanner and a tilted orientation thereof for the movement of the scanner described above.

The inclination of the scanner (imaging means) relative to a vertical direction of a surface of a medium can be recognized from a difference in brightness in a field of view of the scanner as shown in FIG. 25($b$).

The inclination orientation of the scanner is an angle between the scanner and the paper surface as shown in FIG. 25($a$). It is possible to acquire in which direction the user has tilted the scanner by a following method.

First, calibration is performed. Calibration herein is not the calibration to adjust coordinate values between the screen of the display device and the sheet described above, but is calibration to adjust an angle between the scanner and the paper surface. The scanner is stood perpendicularly to the paper surface, and brightness of cells 1 to 48 shown in FIG. 26 is measured in this state. FIG. 26 shows an area around the scanner. The brightness is expressed as BL0(i). I is a value of a measured cell. For example, the brightness of cell 24 is displayed as BL0(24).

In the scanner, two LEDs are arranged. Therefore, even if the scanner is stood perpendicularly to the paper surface, brightness differs in cells closed to the LEDs and cells away from the LEDs. For this reason, the calibration is performed.

Next, brightness when the scanner is tilted is measured. As shown in FIG. 27($a$), brightness in cells 1 to 48 when the scanner is tilted in a certain direction is measured, and brightness in cell i is expressed as BL(i). A difference between BL(i) and BL0(i) of each cell is then calculated. Thereafter, Max(BL0(i)−BL(i))

is calculated.

When the scanner is tilted, a part opposite to a direction in which the scanner is tilted becomes dark. Because the LEDs are also tilted in the direction in which the scanner is tilted, at the part opposite to the tilted direction, a distance from the LEDs increases. Therefore, as shown in FIG. 27($b$), the direction opposite to the cell which has the maximum difference becomes the position for which the scanner is tilted.

Thus, the direction in which the scanner is tilted is determined.

Next, another method of determining an inclination direction and an angle by performing calibration is explained referring to FIG. 26 to FIG. 27.

First, calibration is performed. The scanner is stood perpendicularly to the paper surface, and then brightness of cells 1 to 48 shown in FIG. 26 is measured. The brightness of cell i is expressed as BL0(i).

Subsequently, the scanner is tilted by 45°, and rotated once about a penpoint as an axis as shown in FIG. 27. The brightness when the scanner is positioned at cell i is expressed as BL45(i). BL45(i) of cells 1 to 48 is acquired. By the above operation, the calibration is finished.

Next, brightness of cells 1 to 48 when the user tilts the scanner is measured, and the brightness in cell i is expressed as BL(i), i=1, n(=48). And then, $$\text{Max} \frac{BL0(i) - BL(i)}{BL0(i) - BL45(i)}, i = 1, n = 1, n(=48)$$

is calculated.

Because BL0(i)−BL45(i) is fixed, when a value of BL0(i)−BL(i) is the maximum, in other words, when BL(i) takes the smallest value, $$\frac{BL0(i) - BL(i)}{BL0(i) - BL45(i)}, i = 1, n = 1, n(=48)$$

becomes the maximum value. As described above because a part in the direction opposite to the direction in which the scanner is tilted becomes the darkest, an opposite direction to the cell i in this case is the direction in which the scanner is tilted.

Moreover, the angle by which the scanner is tilted is $$\theta = 45 \times \frac{BL0(i) - BL(i)}{BL0(i) - BL45(i)}, i = 1, n = 1, n(=48)$$

While the above expression assumes that an angle θ with respect to the brightness becomes linear, to be exact, if it is approximated as shown below with a trigonometric function or the like, the accuracy can be further enhanced. Then, the angle is to be $$\theta = \frac{1}{2} \cos^{-1} \left( \frac{BL(i) - BL45(i)}{BL0(i) - BL45(i)} \right)$$

FIG. 29 shows a method of measuring an inclination direction using a Fourier function.

Figure 28:
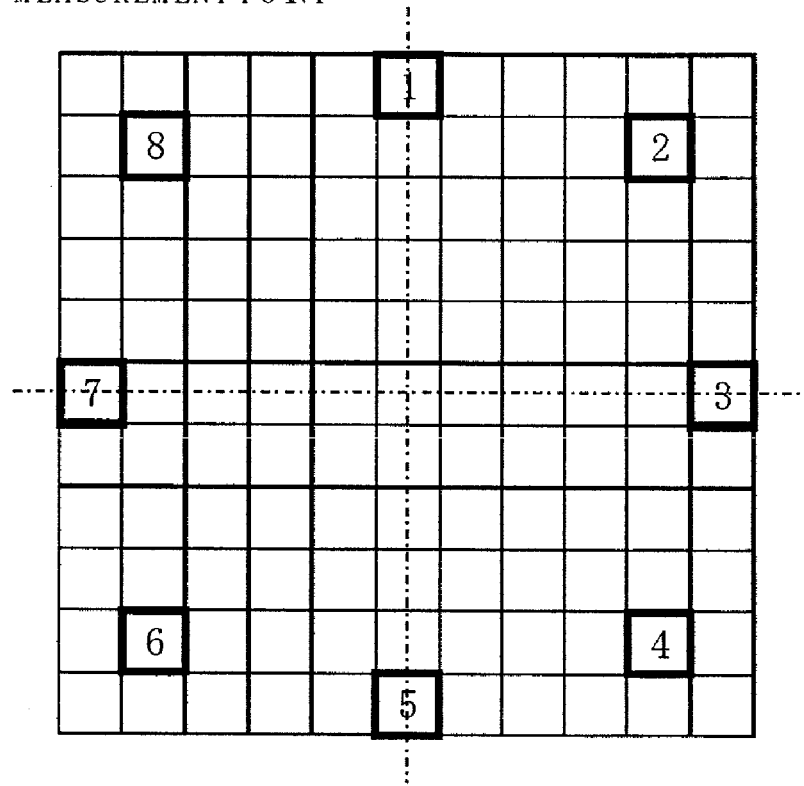
FIG. 28 is a diagram for explaining a method of measuring an inclined direction and an angle when various operations are performed by tilting the scanner.

As shown in FIG. 28, eight pieces of cells 1 to 8 are measurement points, and brightness of each cell is measured.

A sine function is expressed as $$\alpha_j \left\{ \sin\left(\frac{1}{2}\right)^{j-1} (\theta - \beta_j) \right\}$$

Therefore, there are two unknown quantities.

Accordingly, when there are n pieces of measurement points, it means there are n pieces of points apart from each other. Therefore, a sum of n/2 sine functions is calculated. This is brightness BL(i) from an analysis center to the radius. Therefore, it is expressed as $$BL(i) = \sum_{j=1}^{\frac{n}{2}} \alpha_j \left\{ \sin\left(\frac{1}{2}\right)^{j-1} (\theta - \beta_j) \right\}$$

where n=2 m (n is the number of measurement points).

In the present embodiment, since the measurement points are eight, n=8. Therefore, by combining four expressions of sine functions, α1 to α4 and β1 to β4 of Fourier series are acquired. The brightness BL(i) from the analysis center to the radius is expressed by a sum of four sine functions.

From the above expression, the angle θ at which BL(i) takes the smallest value is the darkest position, and a direction 180° opposite thereto is the direction to which the scanner is tilted.

Figure 30:
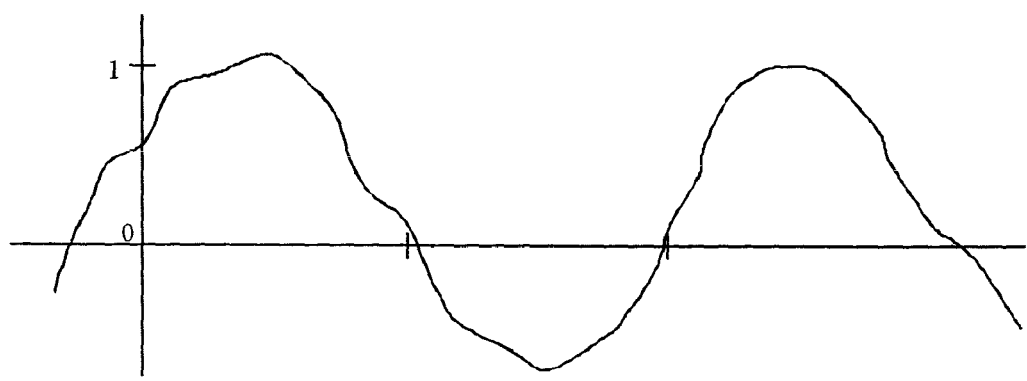
FIG. 30 is a diagram for explaining a method of measuring an inclined direction using an n-th degree equation when various operations are performed by tilting the scanner.

FIG. 30 shows a method of measuring the tilted direction by solving nth-degree equation.

A graph shown in FIG. 30 indicates n-dimensional function. When an n-dimensional function is used, the brightness BL(i) from the analysis center to the radius is expressed as $$BL(i) = \alpha 1(\theta - \beta 1) \cdot \alpha 2(\theta - \beta 2) \ldots \alpha j(\theta - \beta j)$$

where j=n/2, n=2 m.

As shown in FIG. 28, since the measurement points are eight in the present embodiment, it is required to acquire eight solutions. Since a single equation has two unknown quantities of αj and βj, by solving four equations, α1 to α4 and β1 to β4 are acquired.

Thus, the angle θ at which BL(i) takes the smallest value is acquired. The position of the angle θ is the darkest position, and a direction 180° opposite thereto is the direction to which the scanner is tilted.

By the measuring method shown in FIG. 29 and FIG. 30, the inclination of the scanner relative to the vertical line of the sheet cannot be obtained. Therefore, by combining with the measuring method shown in FIG. 26 to FIG. 27, an angle at which the scanner is tilted can be specifically measured.

As shown in FIG. 25, the central processing unit (CPU) recognizes light and shade of an image captured by the scanner, and determines that the scanner is rotated, when the light and shade of the image changes as rotated about the imaging center.

(Painting)

A user can apply colors on a mesh, or paste a pattern or a photograph in a mask area by a painting function.

First, an area of "start painting" in the modeling controller is selected (imaged) with the scanner (optical reading means).

Next, either one of "pen", "spray", and "brush" is selected (imaged) to determine a type of brushes.

Subsequently, parameters of the brush are determined. When thickness of the brush is to be determined, "thickness" is selected (imaged) with the scanner, when shading is to be determined, "shading" is selected, and when clearness is to be determined, "clearness" is selected. By selecting (imaging) triangular icons of "up" and "down" with the scanner, the parameters of the brush can be changed. To return to an initial state, "initial state" is selected (imaged) with the scanner. When the parameters of the brush are determined by such operations, "determine" is selected (imaged) with the scanner.

Colors are then selected in a color palette. The user selects (images) a panel of a desirable color in the color palette with the scanner.

How to draw is then selected.

To draw a polygonal line, "straight line" is selected (imaged) with the scanner, and then positions are sequentially changed by moving the scanner on the paper surface.

When the scanner is separated from the paper surface, a polygonal line is drawn.

To draw a curved line, "curved line" is selected (imaged) with the scanner, and then positions are sequentially changed by moving the scanner on the paper surface. When the scanner is separated from the paper surface, a curved line is drawn automatically.

To fill an entire mask area, "fill mask area" is selected (imaged) with the scanner, and a position on the paper corresponding to an area inside a border for which a mask is set is selected (imaged) with the scanner. As a result, the inside of the mask is colored with the color selected above.

To past a pattern or a photograph on a mask area, "pattern" or "photograph" is selected (imaged) with the scanner. As a result, a list of patterns or photographs is displayed on a monitor.

The user selects (images) triangular icons with the scanner to select a pattern or a photograph to be displayed in shade. When a pattern or a photograph to be used is displayed in shade, "determine" is selected (imaged) with the scanner, to choose the pattern or the photograph.

Subsequently, a position on the paper corresponding to an area inside a border for which a mask is set is selected (imaged) with the scanner. As a result, the pattern or the photograph selected above is pasted inside this mask area.

To go back to a previous operation on the screen to redo the work on the display device, "undo" in the modeling controller is selected (imaged) with the scanner. To move forward, "move forward" is selected (imaged) with the scanner.

Finally, when the painting is finished, "finish" is selected (imaged) with the scanner.

THIRD EMBODIMENT

Make-Up Simulation

FIGS. 31 to 34 are diagrams for explaining make-up simulation, which is one of the embodiments of the present invention.

A method is explained in which a sheet on which the above described dot pattern has been printed is prepared and correction and processing of an image displayed on the display device (monitor), using the scanner is performed on the sheet.

As one of the application programs stored in the hard disk unit (HD) described in FIG. 1, a make-up simulation program is installed. This make-up simulation program is to perform simulation of make-up on a face image (it can be a photographic image or a CG image) displayed on the display device.

In the present embodiment, selection of a cheek brush and a color palette used in the simulation is performed using the sheet on which the dot pattern is printed.

On the sheet, the dot pattern described in FIG. 2 and the like is printed in advance as shown in (b) in the drawings.

In this embodiment, the dot pattern indicating XY coordinates is printed on the sheet.

The sheet is set in a printing device (printer) not shown, and a face image shown in FIG. 31(a) is printed thereon. At this time, the face image is printed on an upper half of the sheet, and a controller image (make-up controller) is printed on a lower half of the sheet (see FIG. 32). In this controller image, a designation area to input "type of cosmetics", "make-up file", "color palette", "favorite", and the like is printed with rectangular and triangular areas. By optically reading the designation area with the scanner, coordinates or a code of the dot pattern in the designation area is converted into a command by an analysis program to be given to the simulation program.

To accurately reflect selection of a make-up material or the like with the scanner to the face image displayed on the screen of the display device, it is required to make the screen and the sheet agree with each other in positional relation.

Calibration to obtain such agreement is performed as follows.

First, for the sheet, a reference point of an image on the display device is set in advance together with the image, and the reference point is printed in a visible mark (shown with ●) together with the image. This mark can be displayed also on the screen of the display device.

Figure 32:
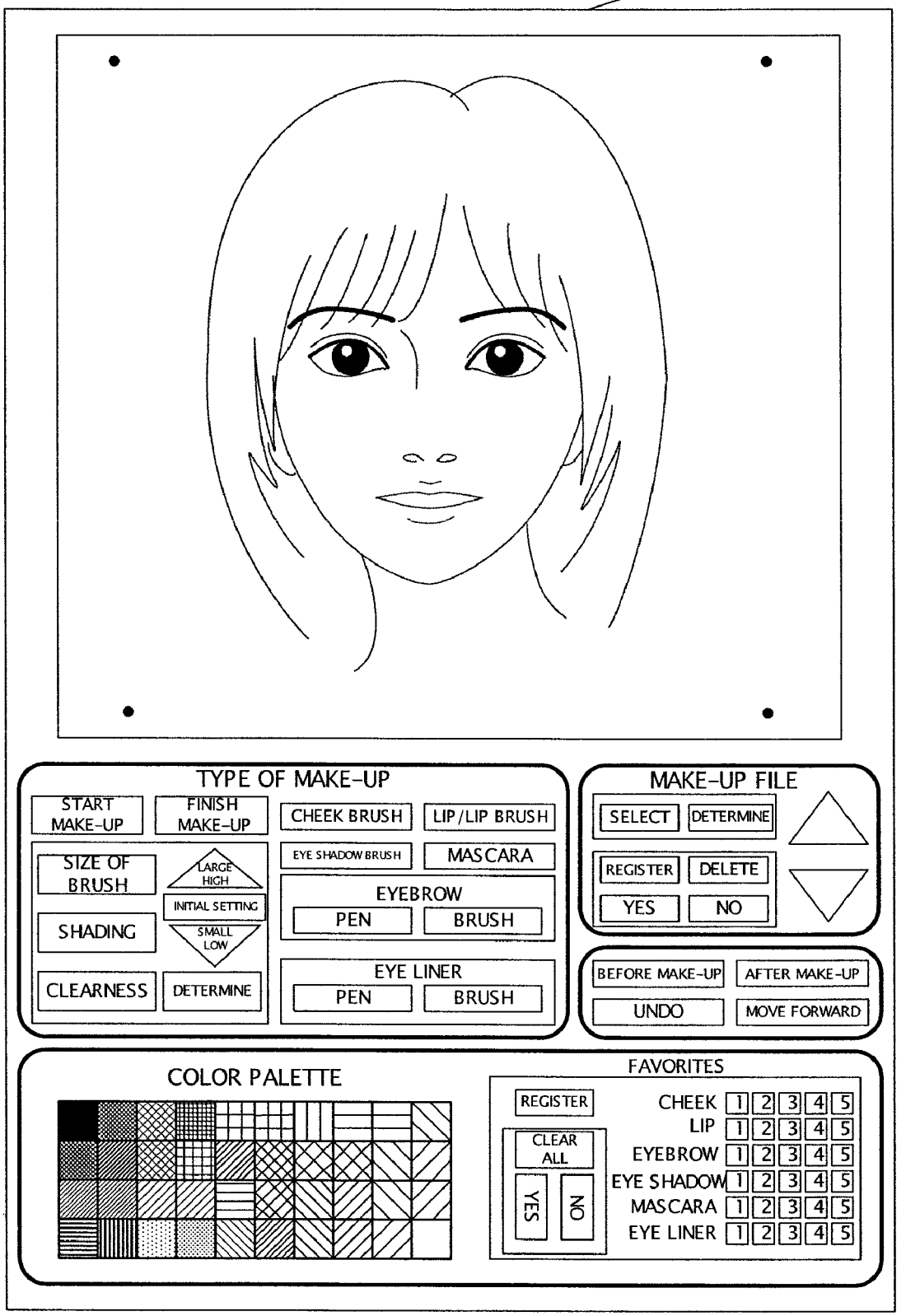
FIG. 32 is an explanatory diagram of the make-up simulation, and shows a specific example of a make-up controller.

When the calibration is performed using the mark thus printed, first, a calibration button (mark) shown with ● (black dot) at the upper left on the sheet on which the face image shown in the upper half of FIG. 32 is printed is pointed (touched) with the scanner.

Subsequently, ● (black dot) at the bottom right, ● (black dot) at the upper right, and ● (black dot) at the bottom left are sequentially pointed (touched) with the scanner. By pointing (touching) these four calibration buttons, position coordinates of each calibration button on the sheet are given to the simulation program, to make the position coordinates agree with those of calibration buttons at four points on the display device.

By performing such calibration, the coordinates on the sheet and the image on the display device agree with each other in the positional relation. As a result, processing of make-up can be performed on the face image displayed on the screen at accurate positions.

<Make-Up Controller>

Next, a procedure of the simulation by the make-up simulation program using the make-up controller described in the lower half of FIG. 32 is specifically explained.

A user first selects (images) "start make-up" with the scanner to start the make-up simulation.

A make-up file is then selected. When "select" is selected, a list of files that have already been registered is displayed on the display device. The user selects (images) upward and downward triangular icons to select a make-up file to be displayed in shade. When the make-up file to be used is displayed in shade, "determine" is selected (imaged) with the scanner.

Next, a type of make-up is selected. Default of the type of make-up in the make-up simulation program is set to a cheek brush. Therefore, when the cheek brush, which is default, is selected, it is proceeded to a next operation. When "lip stick/lip brush", "eye shadow brush", "mascara", "eyebrow", or "eye liner" is selected, a desirable make-up is selected (imaged) with the scanner.

Next, the size of a brush, shading, and clearness are determined. To choose the size of a brush, "size of brush" is selected (imaged) with the scanner. To make the size lager, a triangular icon pointing upward is selected (imaged), and to make the size smaller, a triangular icon pointing downward is selected. To return to an initial setting, "initial setting" is selected (imaged) with the scanner. When thickness is determined, "determine" is selected (imaged) with the scanner. When shading or clearness is determined, "shading" or "clearness" is selected (imaged) with the scanner to determine similarly.

The make-up simulation is then performed. First, color is selected in a color palette. The user selects (images) a panel of a desirable color with the scanner.

To register the selected color in favorites, "register" is selected (imaged) with the scanner. As a result, the color is added thereto. When five colors have already been selected for the make-up, number wished to be changed is selected (imaged) with the scanner. Furthermore, to select a color from among colors that have been registered in favorites, registered number of a make-up (for example, cheek 1) is selected (imaged) with the scanner.

When the type and color of make-up is determined, a part of a face photograph on which the make-up is wished to be put is selected (imaged) with the scanner, and then the make-up simulation is performed on the display device.

To go back to a state before the make-up after the make-up simulation has been performed, "before make-up" is selected (imaged) with the scanner. To go back to a previous screen, "undo" is selected (imaged) with the scanner. To move forward thereafter, "move forward" is selected (imaged) with the scanner.

The make-up file is then registered.

When the make-up simulation is completed, "register" of the make-up file is selected (imaged) with the scanner to register the file. "Overwrite?" is then displayed on the screen of the display device. The user selects (images) either "yes" or "no" with the scanner to determine whether to overwrite the file. When not overwriting the file, "input file name" is displayed on the screen of the display device. When the user inputs an arbitrary file, a new file is created.

When the registration is executed, not only the screen after the make-up is registered, but also processes of the make-up are registered.

Finally, "finish make-up" is selected (imaged) with the scanner to finish the make-up simulation.

For the processing and correction of the face image shown in FIG. 31, while only a basic technique in which XY coordinates are specified with the dot pattern to perform coloring or color correction has been explained, it is preferable, in such a case also, that a range an influence of the color correction reaches be specified by specifying a range of lips, a range of cheeks, and a range of hair, for example.

In this case, the mask specification processing is required on the image. Since the mask specification processing is the same as the embodiment described above, the explanation thereof is omitted.

FIG. 33 to FIG. 34 are diagrams explaining another embodiment of a method of printing the make-up controller.

FIG. 33 shows an example in which the controller is printed in advance. In the upper half of the sheet, a dot pattern indicating XY coordinates is printed in advance. In the lower half of the sheet, the controller is printed, and dot patterns indicating code values are printed on respective icons of the controller in a superimposed manner. This sheet is set in a printing device (printer) not shown, and when a face image displayed on the display device is printed, the face image is output on an area in which the dot pattern indicating the XY coordinates is printed. A user performs the calibration described above in the face image area, and then performs the make-up simulation.

As described, if the controller is printed in advance, a user can perform the make-up simulation easily. In addition, it is not limited to the controller for the make-up simulation, and various controllers can be created and printed in advance. Therefore, it is possible to provide a controller meeting the needs of users.

FIG. 34 shows an example in which the make-up controller is printed on a blank sheet. A user scans the periphery of a face image displayed on the display device and outlines of icons of the controller with a mouse or the like to specify masks. A blank sheet is set in a printing device (printer) not shown to perform printing, at the face image and areas around the periphery the image is printed in a superimposed manner with a dot pattern indicating XY coordinates, and at the respective icons of the controller the image is printed in a superimposed manner with a dot pattern indicating a code value. In this case, the calibration is not necessary, and the user can start the make-up simulation right after the printing.

The operations in each of the embodiments described above can be performed without using the controllers by attaching on the surface of the display device a sheet or the like on which a dot pattern is printed and by selecting (imaging) a corresponding position on the screen of the display device.

Furthermore, instead of using the sheet, it can be configured to perform a processing corresponding to a dot pattern by scanning, with a scanner, an image that is projected by a projector on a white board or on a screen on which a dot pattern is printed.

INDUSTRIAL APPLICABILITY

The present invention is applicable to control technology on a screen of a display device.

The invention claimed is:

1. An image processing method of processing an image displayed on a display device, the image processing method in which the image is printed on a sheet on which a dot pattern has been printed, and the dot pattern is imaged by an imaging device, thereby enabling position recognition on the image, the image processing method comprising:
   printing the dot pattern indicating XY coordinates on the sheet;
   printing the image displayed on a screen of the display device, on the sheet on which the dot pattern is printed;
   setting and printing a reference point of the image displayed on the display device in a form of a visible mark together with the image, at the printing the image;
   performing calibration to match coordinates of a position of the mark on the sheet with the reference point of the image, by imaging the mark printed on the sheet by the imaging device; and
   performing an image processing on the image printed on the sheet by the imaging device.

2. The image processing method according to claim 1, wherein the image processing is a two-dimensional image processing or a processing to cause three-dimensional deformation performed on an area that is a part or all of an image area specified by making a predetermined movement with the imaging device on the sheet, the image area corresponding to the sheet and displayed on the display device.

3. The image processing method according to claim 2, wherein the image processing is three-dimensional deformation and in an operation for the three-dimensional deformation is a grid grind operation of the imaging device, that is, rotation about a vertical line in a tilt state in which a certain inclination of an imaging optical axis relative to the vertical line of a medium surface is kept and recognition of a change in the tilt state of the imaging optical axis, and deformation of the image area is deformation in a rise in a Z direction and deformation in a dent in a −Z direction in the image area.

4. The image processing method according to claim 2, wherein the image processing is a modeling process on the image that deforms a corresponding portion of the image in a rise or in a dent in the Z direction or in the −Z direction, respectively, by specifying a predetermined position of the image.

5. The image processing method according to claim 4, wherein in the modeling process, a mask is set in a predetermined shape of an image, and a corresponding portion of the image along a mask shape is expanded or raised in the Z direction or in the −Z direction, respectively.

6. The image processing method according to claim 1, wherein the reference point of the image is arranged at, at least, two points, and the mark is also printed at, at least, two points on the sheet corresponding thereto.

7. An image processing method of processing an image displayed on a display device, the image processing method in which the image is printed on a sheet on which a dot pattern is printed in advance, and the dot pattern is imaged by an imaging device, thereby enabling position recognition on the image, the image processing method comprising:
   printing the image displayed on a screen of the display device, on the sheet on which a dot pattern indicating XY coordinates is printed in advance;
   setting and printing a reference point of the image displayed on the display device in a form of a visible mark together with the image, at the printing the image;
   performing calibration to match coordinates of a position of the mark on the sheet with the reference point of the image, by imaging the mark printed on the sheet by the imaging device; and
   performing an image processing on the image printed on the sheet by the imaging device.

8. The image processing method according to claim 7, wherein the image processing is a two-dimensional image processing or a processing to cause three-dimensional deformation performed on an area that is a part or all of an image area specified by making a predetermined movement with the imaging device on the sheet, the image area corresponding to the sheet and displayed on the display device.

9. The image processing method according to claim 7, wherein the reference point of the image is arranged at, at least, two points, and the mark is also printed at, at least, two points on the sheet corresponding thereto.

* * * * *